(12) United States Patent
Baptist et al.

(10) Patent No.: US 10,904,320 B1
(45) Date of Patent: *Jan. 26, 2021

(54) PERFORMANCE TESTING IN A DISTRIBUTED STORAGE NETWORK BASED ON MEMORY TYPE

(71) Applicant: Pure Storage, Inc., Mountain View, CA (US)

(72) Inventors: Andrew Baptist, Mt. Pleasant, WI (US); Wesley Leggette, Chicago, IL (US); Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,002

(22) Filed: Sep. 29, 2019

Related U.S. Application Data

(63) Continuation of application No. 13/920,635, filed on Jun. 18, 2013, now Pat. No. 10,447,767, which is a
(Continued)

(51) Int. Cl.
  *H04L 29/08* (2006.01)
  *H04L 29/06* (2006.01)
  *H04L 1/24* (2006.01)

(52) U.S. Cl.
  CPC ............. *H04L 67/10* (2013.01); *H04L 63/08* (2013.01); *H04L 63/123* (2013.01); *H04L 67/16* (2013.01); *H04L 1/24* (2013.01)

(58) Field of Classification Search
  CPC ......... H04L 67/10; H04L 63/08; H04L 67/16; H04L 63/123; H04L 1/24
  See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Brian J. Gillis
*Assistant Examiner* — Javier O Guzman
(74) *Attorney, Agent, or Firm* — Garlick & Markison; Timothy W. Markison; Bruce E. Stuckman

(57) ABSTRACT

A method begins by a processing module identifying one or more devices of a dispersed storage network (DSN) potentially contributing to a DSN performance issue. For a device of the identified one or more devices, the method continues where the processing module determines a potential performance issue of the device and determines a performance test based on the potential performance issue. The method continues where the processing module issues a message to the device that includes test information specific for the device to execute the performance test and receives a response message that includes a specific test result data generated based on the test information. The method continues where the processing module determines, based on the specific test result data, whether the device has the potential performance issue and is contributing to the DSN performance issue.

19 Claims, 23 Drawing Sheets

Related U.S. Application Data continuation-in-part of application No. 13/180,669, filed on Jul. 12, 2011, now Pat. No. 8,938,552, and a continuation-in-part of application No. 13/080,431, filed on Apr. 5, 2011, now Pat. No. 9,047,242.

(60) Provisional application No. 61/369,802, filed on Aug. 20, 2010, provisional application No. 61/328,000, filed on Apr. 26, 2010.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,356,951 B1 | 3/2002 | Gentry, Jr. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,463,065 B1 | 10/2002 | Petersen et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,816,886 B2 * | 11/2004 | Elvanoglu ............... H04L 29/06 709/206 |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 7,680,920 B2 * | 3/2010 | Selvaggi ............... H04L 43/50 709/224 |
| 7,738,383 B2 * | 6/2010 | Wing ............... H04L 45/20 370/236 |
| 7,835,293 B2 * | 11/2010 | Cidon ............... H04L 43/0852 370/248 |
| 7,924,881 B2 | 4/2011 | Frank et al. |
| 8,190,947 B1 | 5/2012 | Holl et al. |
| 8,386,838 B1 * | 2/2013 | Byan ............... G06F 11/2046 714/6.2 |
| 8,649,399 B2 | 2/2014 | Baptist et al. |
| 2002/0062422 A1 | 5/2002 | Butterworth et al. |
| 2002/0120727 A1 * | 8/2002 | Curley ............... H04L 41/12 709/223 |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0049572 A1 * | 3/2004 | Yamamoto ............ G06F 11/0727 709/224 |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0018611 A1 * | 1/2005 | Chan ............... H04L 41/147 370/241 |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2006/0234639 A1 * | 10/2006 | Kushwaha ............ H04W 24/08 455/67.11 |
| 2006/0280124 A1 * | 12/2006 | Denton ................. H04L 49/555 370/250 |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0174720 A1 * | 7/2007 | Kubo ................. G06F 11/008 714/42 |
| 2007/0174729 A1 | 7/2007 | Jiang et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2008/0008183 A1 | 1/2008 | Takagaki et al. |
| 2009/0063696 A1 | 3/2009 | Wang et al. |
| 2009/0094251 A1 | 4/2009 | Gladwin et al. |
| 2009/0094318 A1 | 4/2009 | Gladwin et al. |
| 2010/0017531 A1 | 1/2010 | Dhuse et al. |
| 2010/0023524 A1 | 1/2010 | Gladwin et al. |
| 2011/0055471 A1 | 3/2011 | Thatcher et al. |
| 2011/0153875 A1 | 6/2011 | Khericha et al. |

OTHER PUBLICATIONS

Examination Report for EP Application No. 11775472.1 dated Apr. 11, 2019; 6 pages.

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

(56) References Cited

OTHER PUBLICATIONS

Shamir; How to Share a Secret; Communications of the ACM; vol. 22, No. 11; Nov. 1979; pp. 612-613.
Smith; Lightweight Directory Access Protocol (LDAP): String Representation of Search Filters; IETF Network Working Group; RFC 4515; Jun. 2006; pp. 1-12.
Smith; Lightweight Directory Access Protocol (LDAP): Uniform Resource Locator; IETF Network Working Group; RFC 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

\* cited by examiner

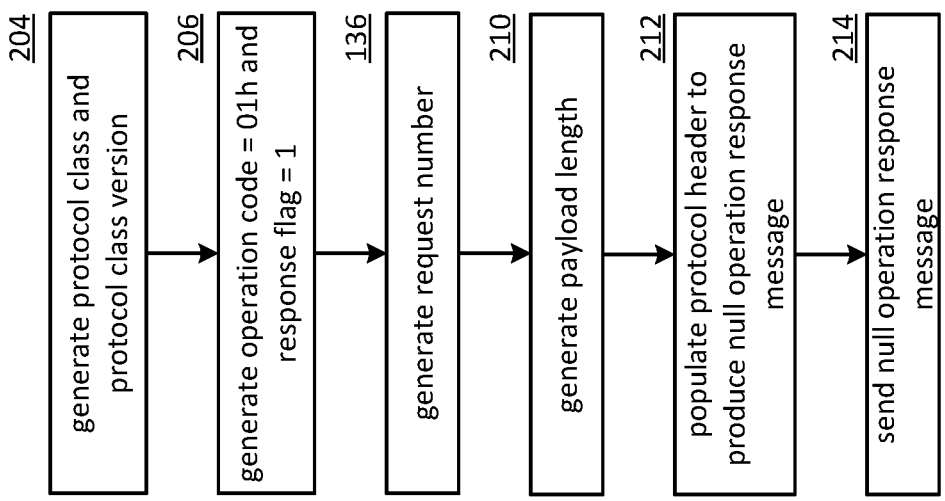
FIG. 10B
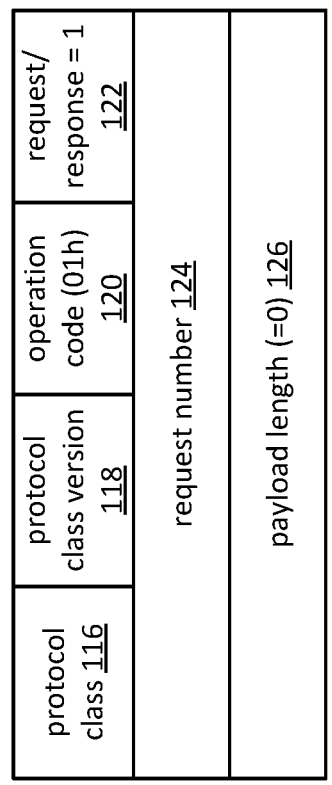
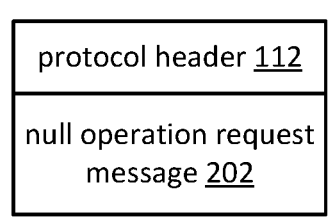
FIG. 10A

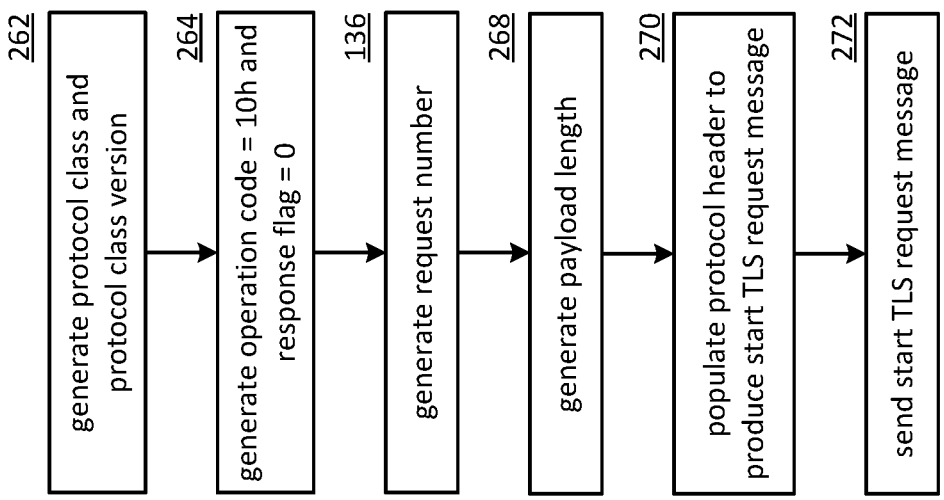
FIG. 13B
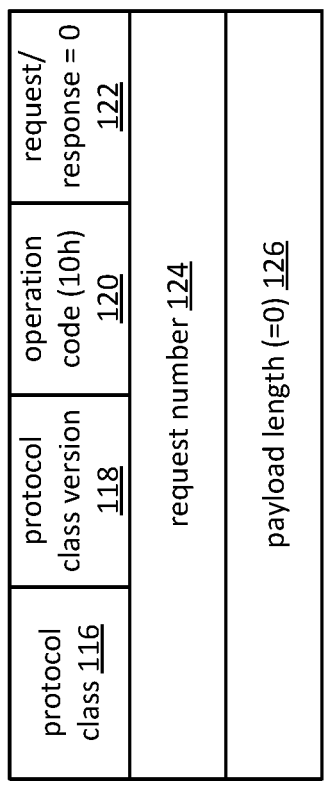
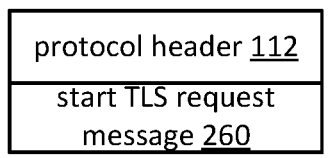
FIG. 13A

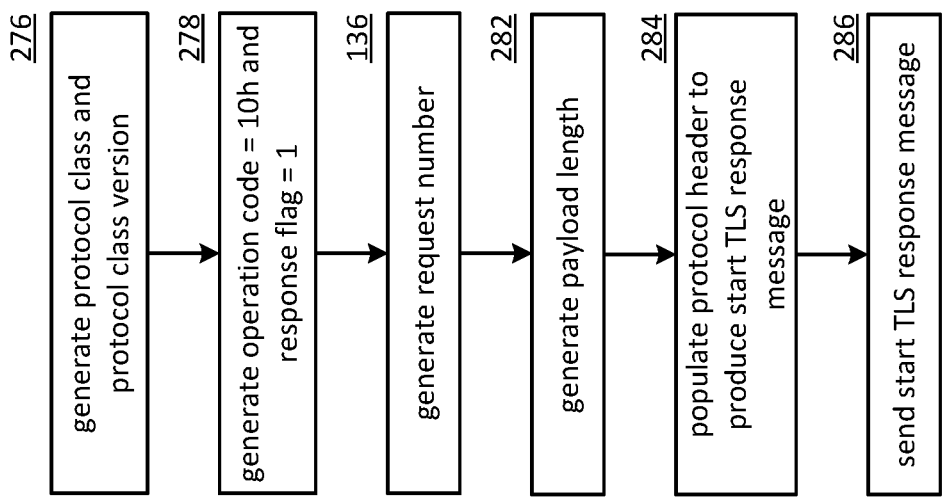
FIG. 14B
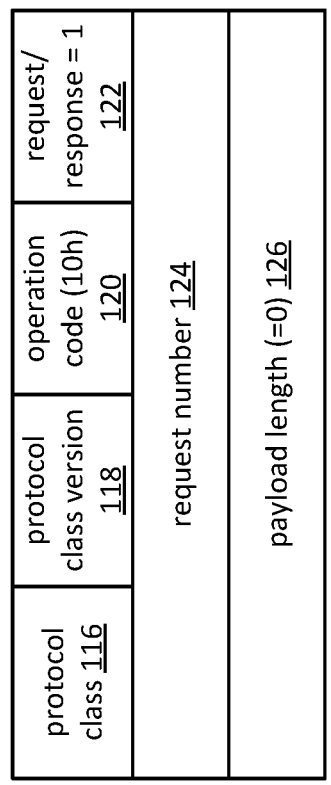
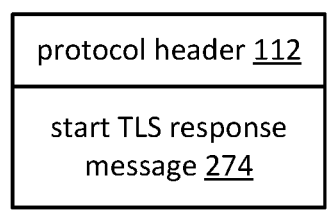
FIG. 14A

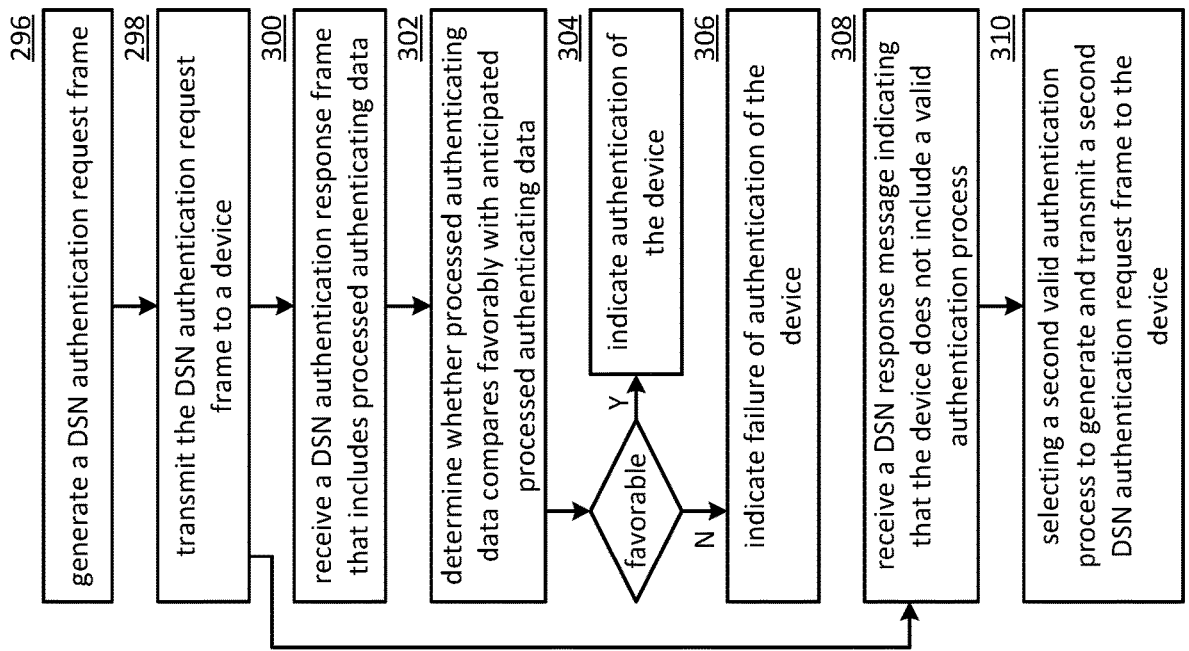
FIG. 15B
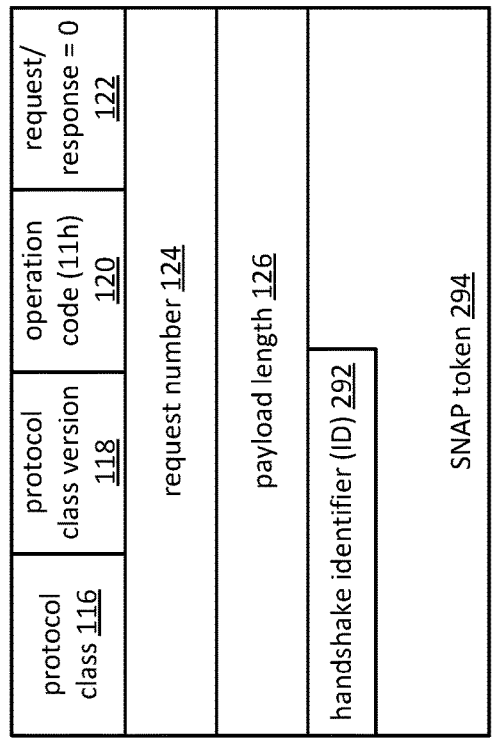
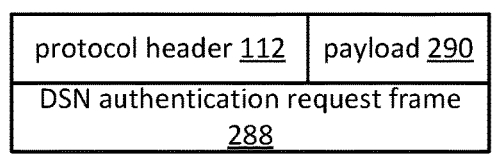
FIG. 15A

PERFORMANCE TESTING IN A DISTRIBUTED STORAGE NETWORK BASED ON MEMORY TYPE

CROSS REFERENCE TO RELATED PATENTS

The present U.S. Utility patent application claims priority pursuant to 35 U.S.C. § 120 as a continuation of U.S. Utility application Ser. No. 13/920,635, entitled "RESOLVING A PERFORMANCE ISSUE WITHIN A DISPERSED STORAGE NETWORK", filed Jun. 18, 2013, which is hereby incorporated herein by reference in its entirety and made part of the present U.S. Utility patent application for all purposes.

U.S. Utility patent application Ser. No. 13/920,635 claims priority pursuant to 35 U.S.C. § 120, as a continuation-in-part (CIP), to the following U.S. Utility patent applications, which are hereby incorporated herein by reference in their entirety and made part of the present U.S. Utility patent application for all purposes:

1. U.S. Utility application Ser. No. 13/180,669, entitled "RESOLVING A PROTOCOL ISSUE WITHIN A DISPERSED STORAGE NETWORK," filed Jul. 12, 2011, issued as U.S. Pat. No. 8,938,552 on Jan. 20, 2015, which claims priority pursuant to 35 U.S.C. § 119(e) to U.S. Provisional Application Ser. No. 61/369,802, entitled "DISPERSED STORAGE SYSTEM ACCESS PROTOCOL FORMAT AND METHOD," filed Aug. 2, 2010, which is hereby incorporated herein by reference in its entirety and made part of the present U.S. Utility patent application for all purposes.
2. U.S. Utility application Ser. No. 13/080,431, entitled "READ OPERATION DISPERSED STORAGE NETWORK FRAME," filed Apr. 5, 2011, issued as U.S. Pat. No. 9,047,242 on Jun. 2, 2015, which claims priority pursuant to 35 U.S.C. § 119(e) to U.S. Provisional Application Ser. No. 61/328,000, entitled "DISPERSED STORAGE SYSTEM ACCESS PROTOCOL FORMAT AND METHOD," filed Apr. 26, 2010, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming, etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 10A is a diagram illustrating an example of a null operation response message format in accordance with the invention;

FIG. 10B is a flowchart illustrating an example of generating a null operation response message in accordance with the invention;

FIG. 13A is a diagram illustrating an example of a start transport layer security (TLS) request message format in accordance with the invention;

FIG. 13B is a flowchart illustrating an example of generating a start transport layer security (TLS) request message in accordance with the invention;

FIG. 14A is a diagram illustrating an example of a start transport layer security (TLS) response message format in accordance with the invention;

FIG. 14B is a flowchart illustrating an example of generating a start transport layer security (TLS) response message in accordance with the invention;

FIG. 15A is a diagram illustrating an example of a storage network authentication protocol (SNAP) request message format in accordance with the invention;

FIG. 15B is a flowchart illustrating an example of authenticating a device of a dispersed storage network (DSN) in accordance with the invention;

DETAILED DESCRIPTION OF THE INVENTION

Figure 1:
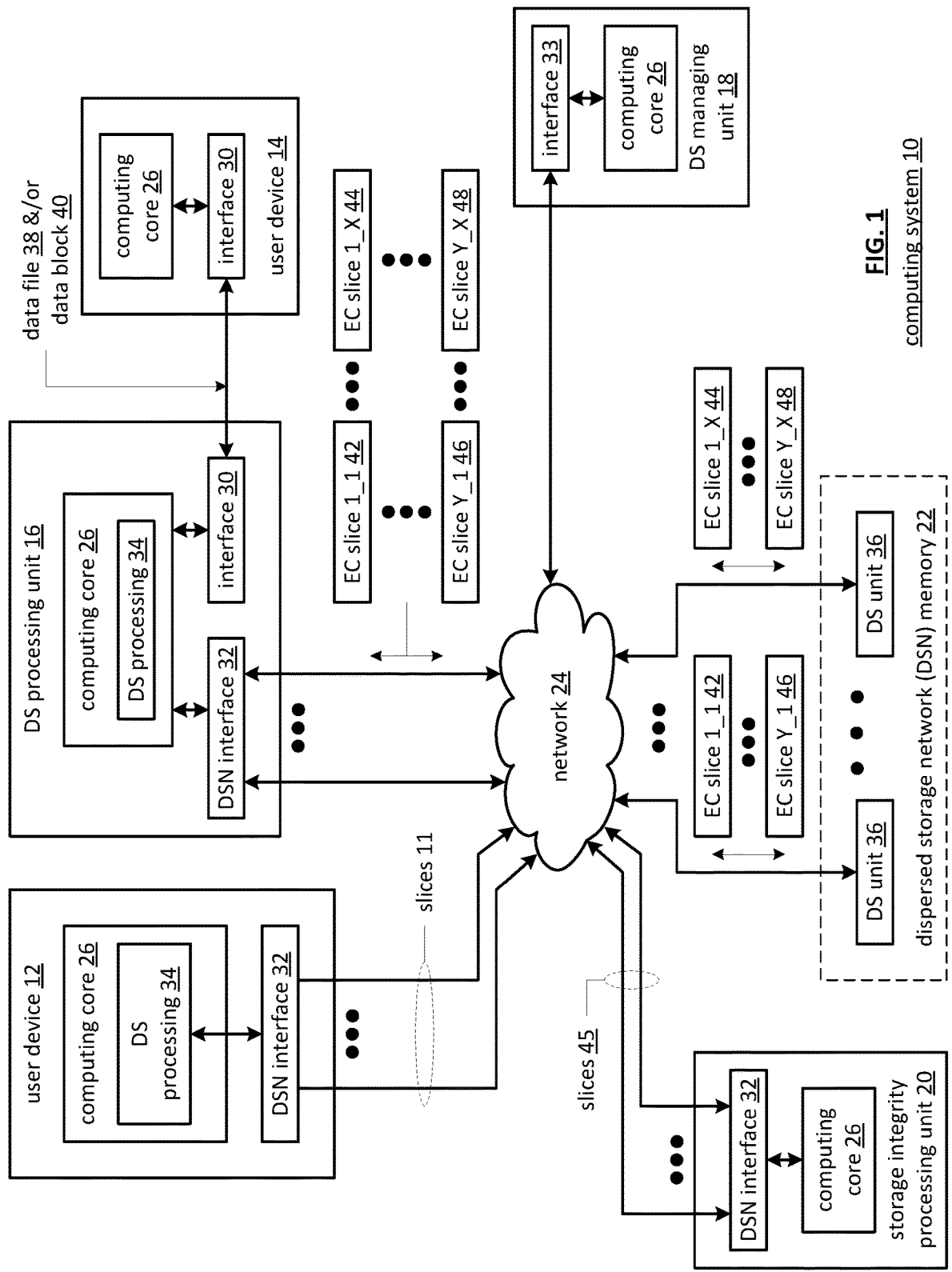
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN)

memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. A processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. A memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-17C.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). A portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the second type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16. A protocol includes a system of message formats (e.g., structure, syntax) and rules (e.g., sequencing, message ordering, exceptions, errors) for exchanging the messages between devices of the computing system 10.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-17C.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments have been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
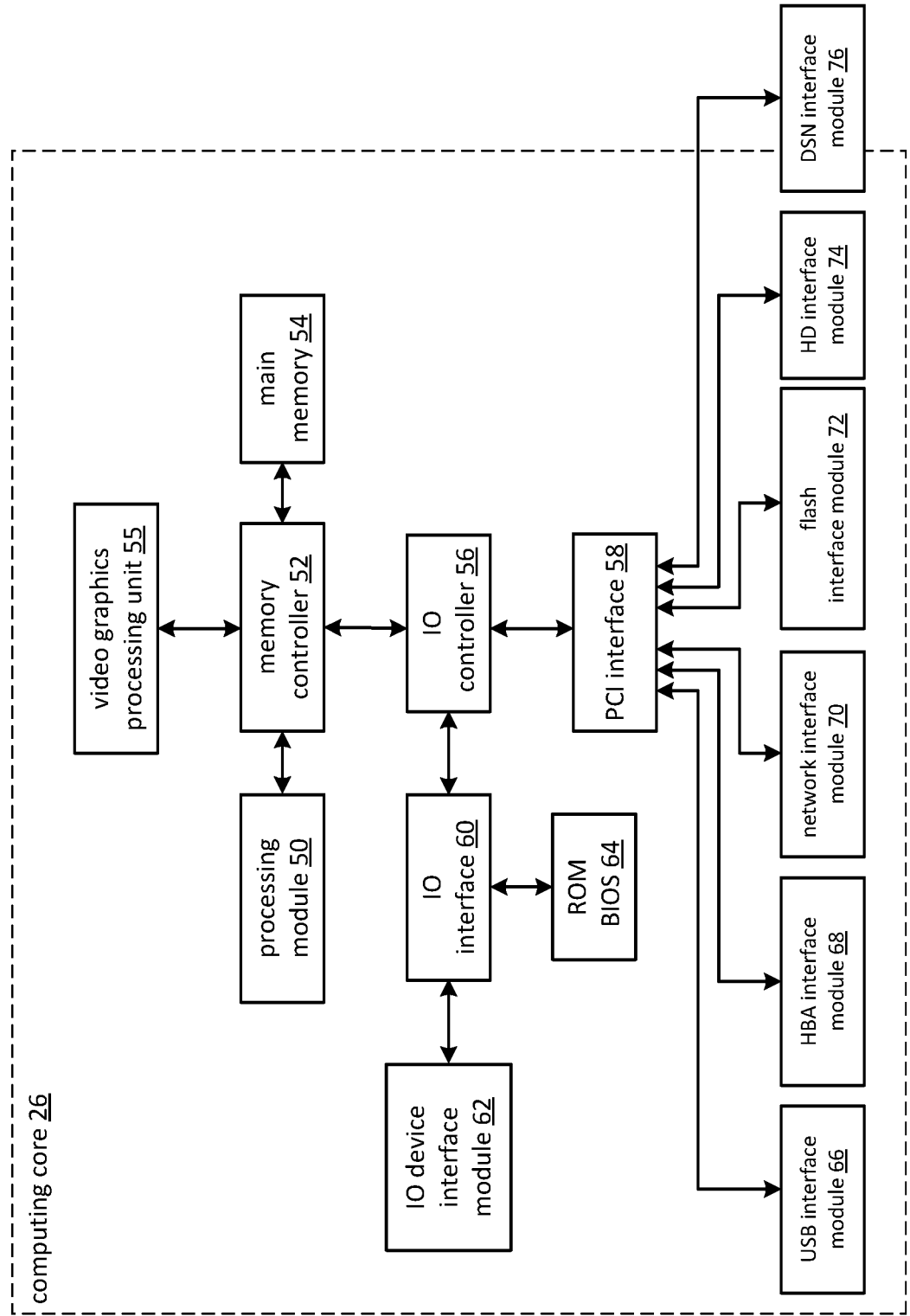
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. A processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. A memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-17C.

Figure 3:
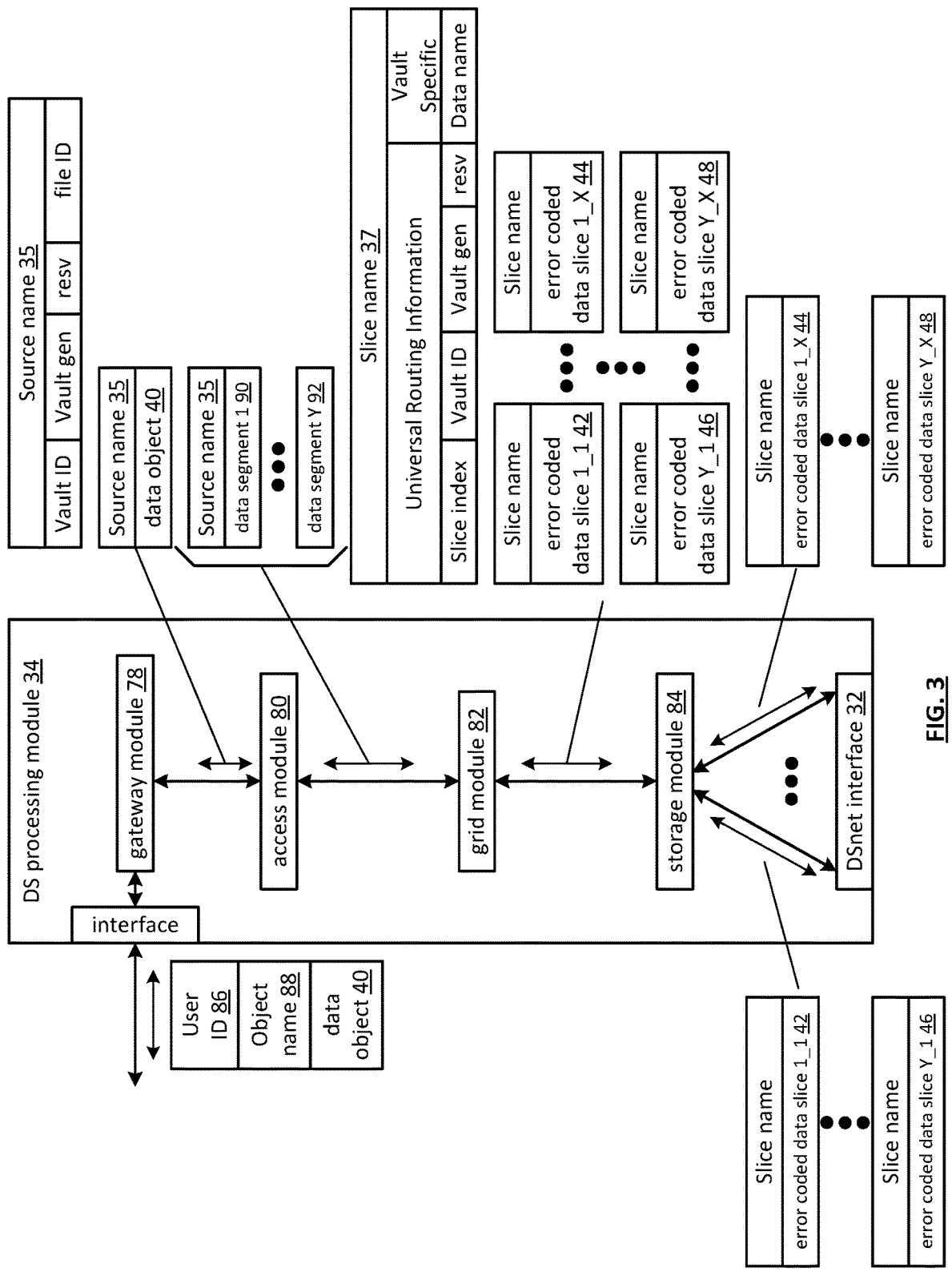
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-48.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
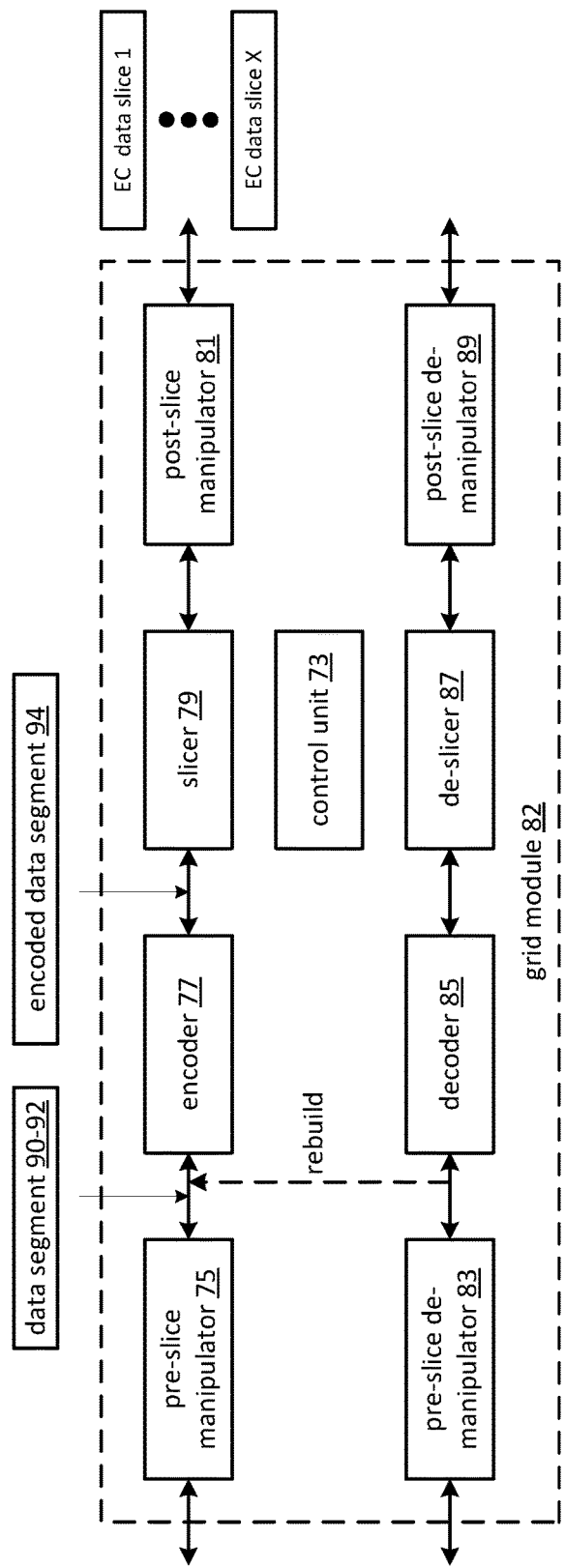
FIG. 4 is a schematic block diagram of an embodiment of a grid module in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 90-92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 90-92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 90-92, the same encoding algorithm for the data segments 90-92 of a data object, or a combination thereof.

The encoded data segment 94 is of greater size than the data segment 90-92 by the overhead rate of the encoding algorithm by a factor of X/T, where X is the width or number of slices, and T is the read threshold. In this regard, the corresponding decoding process can accommodate at most X-T missing EC data slices and still recreate the data segment 90-92. For example, if X=16 and T=10, then the data segment 90-92 will be recoverable as long as 10 or more EC data slices per segment are not corrupted.

The slicer 79 transforms the encoded data segment 94 into EC data slices in accordance with the slicing parameter from the vault for this user and/or data segment 90-92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
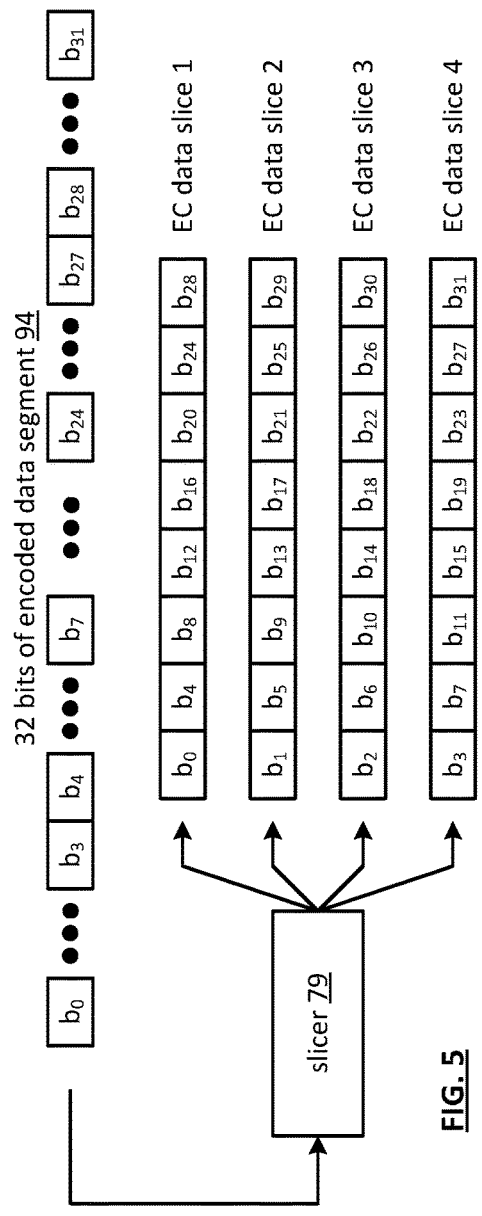
FIG. 5 is a diagram of an example embodiment of error coded data slice creation in accordance with the invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6B:
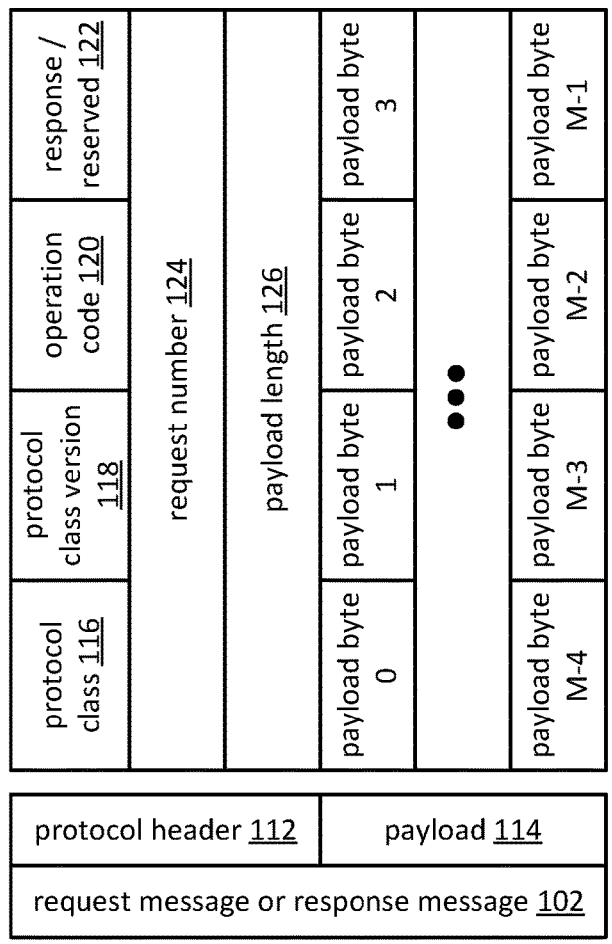
FIG. 6B is a block diagram of an embodiment of a message format in accordance with the invention.
Figure 6A:
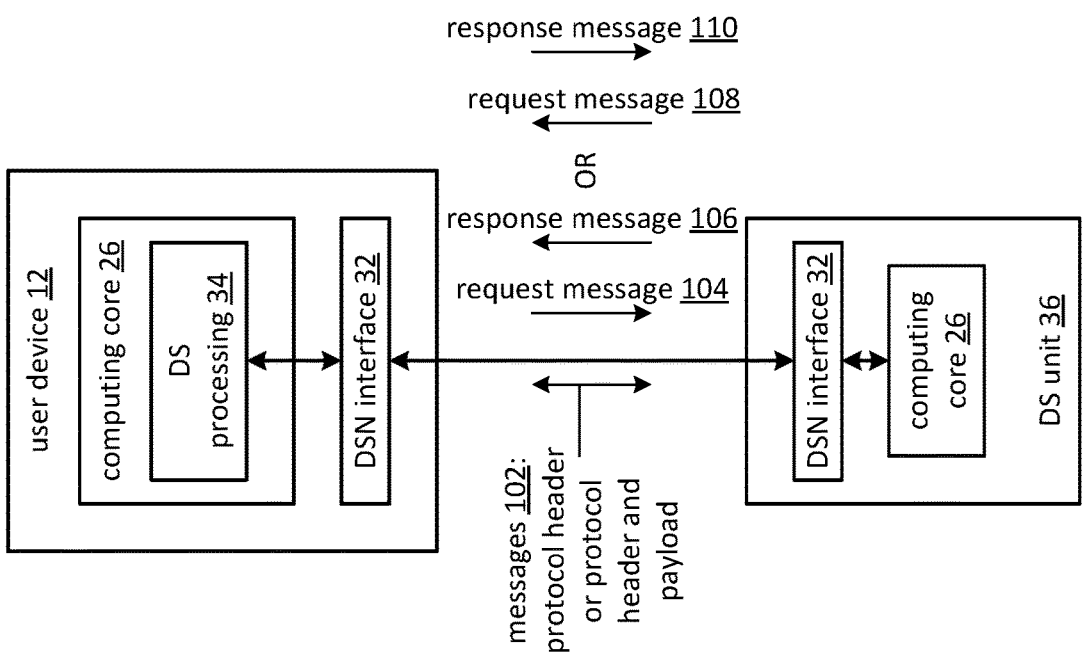
FIG. 6A is a schematic block diagram of another embodiment of a computing system in accordance with the invention.

FIG. 6A is a schematic block diagram of another embodiment of a computing system which includes a user device 12 and a dispersed storage (DS) unit 36. The user device 12 includes a computing core 26 and a dispersed storage network (DSN) interface 32. The computing core 26 includes a DS processing 34. The DS unit 36 includes a computing core 26 and the DSN interface 32. The user device 12 and the DS unit 36 are operably coupled such that the DSN interface 32 of the user device 12 provides communications with the DS unit 36 via the DSN interface 32 of the DS unit 36. The DSN interface 32 of the user device 12 and the DSN interface 32 of the DS unit 36 generate one or more DSN frames to communicate messages 102 between the user device 12 and the DS unit 36. A DSN frame communicates messages 102, wherein the DSN frame includes a protocol header. Alternatively, the DSN frame includes the protocol header and a payload. A format of the DSN is discussed in greater detail with reference to FIG. 6B.

The messages 102 include a request messages 104, 108 and response messages 106, 110, wherein the response messages 106, 110 are formed in response to a corresponding request message of request messages 104, 108. A requester generates and sends a request message 104, 108 to a responder. The responder generates and sends the response message 106, 110 to the requester. For example, the requester generates and sends a read request message 104 to solicit a retrieval action and the responder generates and sends a corresponding read response message 106 to provide information associated with the read request message 104. As another example, the DS processing 34 of the user device 12 (e.g., the requester) generates a request and outputs the request to the DSN interface 32 of the user device 12. The DSN interface 32 of the user device 12 transforms the request to produce and send the request message 104 to the DS unit 36 (e.g., the responder). The computing core 26 of the DS unit 36 generates a response and outputs the response to the DSN interface 32 of the DS unit 36. The DSN interface 32 of the DS unit 36 transforms the response to produce and send the response message 106 to the user device 12.

Requester and responder roles may change when a request/response message pair is initiated by another unit of the system. For example, DS unit 36 (e.g., the requester) generates and sends the request message 108 to the user device 12 (e.g., the responder). The user device 12 generates and sends the response message 110 to the DS unit 36 in response to receiving the request message 108. Such request/response message pairs may be utilized by any module or unit of the system. The request messages 104, 108 may be sent by one requester to one or more responders such that the same request message 104, 108 is sent to two or more responders when a plurality of responders is selected. A selection of a plurality of responders is discussed in greater detail with reference to FIG. 6C.

FIG. 6B is a diagram of an embodiment of a message format for a dispersed storage network (DSN) frame. A DSN frame may be utilized to communicate a request message and a response message 102. The DSN frame includes a protocol header 112. Alternatively, the DSN frame includes the protocol header 112 and a payload 114. A protocol header 112 includes information to request action and/or provide status. A payload 114 includes M payload bytes of supplemental information utilized in further action or in a response related to the information in the protocol header 112.

The protocol header 112 includes one or more of a protocol class field 116, a protocol class version field 118, an operation code field 120, a request/response field 122, a request number field 124, and a payload length field 126. A protocol class field 116 contains any number of bytes to specify a sub-protocol identifier to enable a plurality of families (e.g., versions) of protocols to be utilized. For example, the protocol class field 116 is one byte in length and includes a protocol class value of 01 hex to signify a first protocol class of an older version of a protocol. The protocol class version field 118 contains any number of bytes to specify a sub-protocol version associated with the protocol class 116 enabling a plurality of versions of protocols to be utilized with each protocol class. For example, the protocol class version field is one byte in length and includes a protocol class version value of 01 hex to signify a first protocol class version.

The operation code field 120 contains any number of bytes to specify an operation code associated with a requested action providing message interpretation instructions to a message target. For example, the operation code field is one byte in length and includes an operation code value of a read operation. The request/response field 122 contains any number of bytes to specify whether the message is a request message or a response message. For example, the request/response field 122 is one byte in length and a response/reserve value is indicated by a one bit flag of the byte (e.g., a most significant bit of the byte). In an instance, a flag value of the one bit flag is zero when the message is a request message. In another instance, the flag value of the one bit flag is one when the message is a response message.

The request number field 124 contains any number of bytes to include a request number value to associate at least one request message with at least one response message. A request number value may be produced as at least one of a random number, a random number plus a predetermined number, and based on a previous request number. For example, the request number field 124 is four bytes in length and includes a request number value of 457 to associate a read request message with a read response message when the previous request number value is 456. As another example, the request number field 124 includes a request number value of 5,358 to associate a read response message with a read request message when a request number value of 5,358 is extracted from the read request message.

The payload length field 126 contains any number of bytes to include a payload length value to indicate a number of bytes contained in the payload 114. A payload length value may be determined based on one or more of counting bytes of the payload 114, utilizing a predetermined number based on one or more of the protocol class value, the protocol class version value, the operation code value, and the request/response value, and utilizing a predetermined formula based on one or more of the protocol class value, the protocol class version value, the operation code value, and the response/reserved value. For example, the payload length field 126 is four bytes in length and includes a payload length value of zero when the operation code value is associated with a write rollback response operation and the response/reserved value is associated with a response message. As another example, the payload length field 126 includes a payload length value of 104 when the operation code value is associated with a read request message and a predetermined formula of 48n+8 associated with the read request message is utilized (e.g., where n=2 corresponding to 2 slice names).

The payload 114 may be organized into one or more payload fields in accordance with one or more of the values of the protocol class field 116, protocol class version field 118, the operation code field 120, and the request/response field 122. The one or more payload fields include payload bytes 0-M, wherein values of the payload bytes 0-M are established in accordance with the one or more payload fields. For example, the one or more payload fields include slice name fields when the payload 114 is associated with a read request DSN frame. As another example, the one or more payload fields include one or more encoded data slices when the payload 114 is associated with a read response DSN frame. The method to generate the fields of the DSN frame and to generate values for the fields is discussed in greater detail with reference to FIGS. 6D-17C.

Figure 6C:
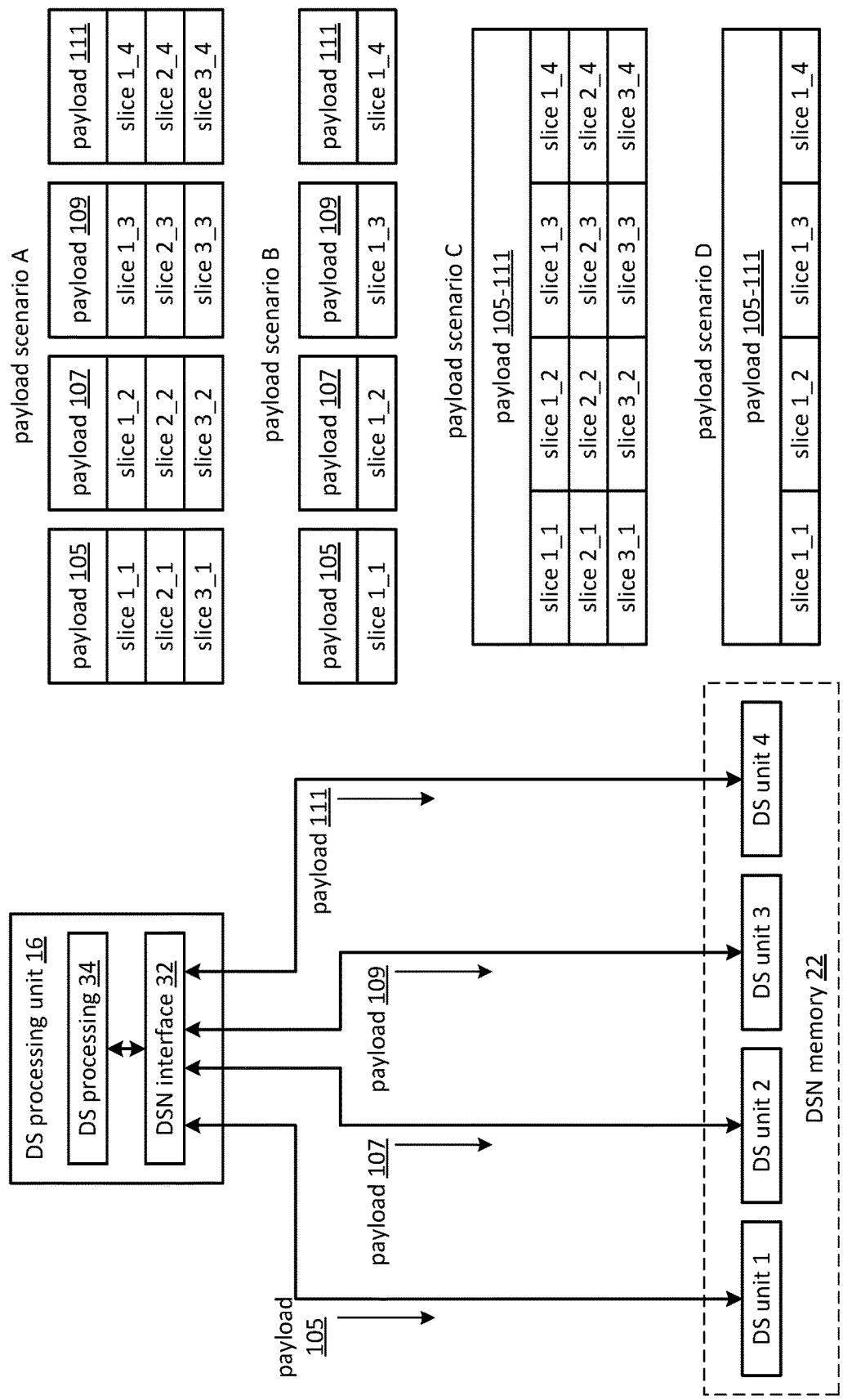
FIG. 6C is a schematic block diagram of another embodiment of a computing system in accordance with the invention.

FIG. 6C is a schematic block diagram of another embodiment of a computing system that includes a dispersed storage (DS) processing unit 16, a dispersed storage network (DSN) memory 22, and payload scenarios A-D. A DS processing unit 16 includes a DS processing 34 and a DSN interface 32. A DSN memory 22 includes DS units 1-4 when dispersed storage error coding parameters include a pillar width of 4. The DS processing unit 16 generates one or more request DSN frames wherein each DSN frame includes a payload. The DS processing unit 16 sends the one or more request DSN frames to DS units 1-4. The DS processing unit 16 sends a DSN frame to DS unit 1 that includes a payload 105, sends a DSN frame to DS unit 2 that includes a payload 107, sends a DSN frame to DS unit 3 that includes a payload 109, and sends a DSN frame to DS unit 4 that includes a payload 111. Each payload of the payloads 105-111 may be unique or maybe the same. For example, the DS processing unit 16 produces a plurality of encoded data slices, generates one or more write request messages that include the plurality of encoded data slices within one or more write request DSN frames, and sends the one or more write request DSN frames to the DSN memory 22 to facilitate storing the plurality of encoded data slices in the DS units 1-4.

In an example of operation, the DS processing 34 dispersed storage error encodes data utilizing the dispersed storage error coding parameters to produce 3 sets of encoded data slices 1_1 through 3_4 (e.g., set one includes slices 1_1 through 1_4). The DS processing 34 outputs a write request that includes the three sets of encoded data slices to the DSN interface 32. The DSN interface 32 generates at least one write request DSN frame wherein at least one payload section of the at least one write request DSN frame includes at least one encoded data slice of the three sets of encoded data slices. The DSN interface 32 sends the at least one write request DSN frame to the DS units 1-4 wherein the at least one write request DSN frame sent to DS unit 1 includes payload 105, the at least one write request DSN frame sent to DS unit 2 includes payload 107, the at least one write request DSN frame sent to DS unit 3 includes payload 109, and the at least one write request DSN frame sent to DS unit 4 includes payload 111.

The DSN interface 32 selects at least one encoded data slice of the three sets of encoded data slices to include in each of the payloads 105-111. The DSN interface 32 may select at least one of all slices of a corresponding pillar of the three sets of encoded data slices per payload (e.g., pillar one slices are included in the payload 105), one slice of the corresponding pillar of the three sets of encoded data slices per payload (e.g., one slice of pillar 2 is included in payload 107), all encoded data slices of the three sets of encoded data slices for all payloads 105-111, and one set (e.g., from one data segment) of encoded data slices of the three sets of encoded data slices for all payloads 105-111.

The payload scenarios A-D represent example scenarios indicating which encoded data slices of the three sets of encoded data slices are included in the payloads 105-111. Payload scenario A represents a scenario where the DSN interface 32 selects all slices of the corresponding pillar of the three sets of encoded data slices per payload. For example, the DSN interface 32 selects slices 1_1, 2_1, and 3_1 of pillar 1 to be included in payload 105, slices 1_2, 2_2, and 3_2 of pillar 2 to be included in payload 107, slices 1_3, 2_3, and 3_3 of pillar 3 to be included in payload 109, and slices 1_4, 2_4, and 3_4 of pillar 4 to be included in payload 111. Payload scenario B represents a scenario where the DSN interface 32 selects one slice of the corresponding pillar of the three sets of encoded data slices per payload. For example, the DSN interface 32 selects slice 1_1 of pillar 1 to be included in payload 105, slice 1_2 of pillar 2 to be included in payload 107, slice 1_3 of pillar 3 to be included in payload 109, and slice 1_4 of pillar 4 to be included in payload 111.

Payload scenario C represents a scenario where the DSN interface 32 selects all encoded data slices of the three sets of encoded data slices for all payloads 105-111. For example, the DSN interface 32 selects slices 1_1, 1_2, 1_3, 1_4, 2_1, 2_2, 2_3, 2_4, 3_1, 3_2, 3_3, and 3_4 to be included in each payload of payloads 105-111. Payload scenario D represents a scenario where the DSN interface 32 selects one of the encoded data slices of the three sets of encoded data slices for all payloads 105-111. For example, the DSN interface 32 selects slices 1_1, 1_2, 1_3, and 1_4 to be included in each payload of payloads 105-111.

Figure 6D:
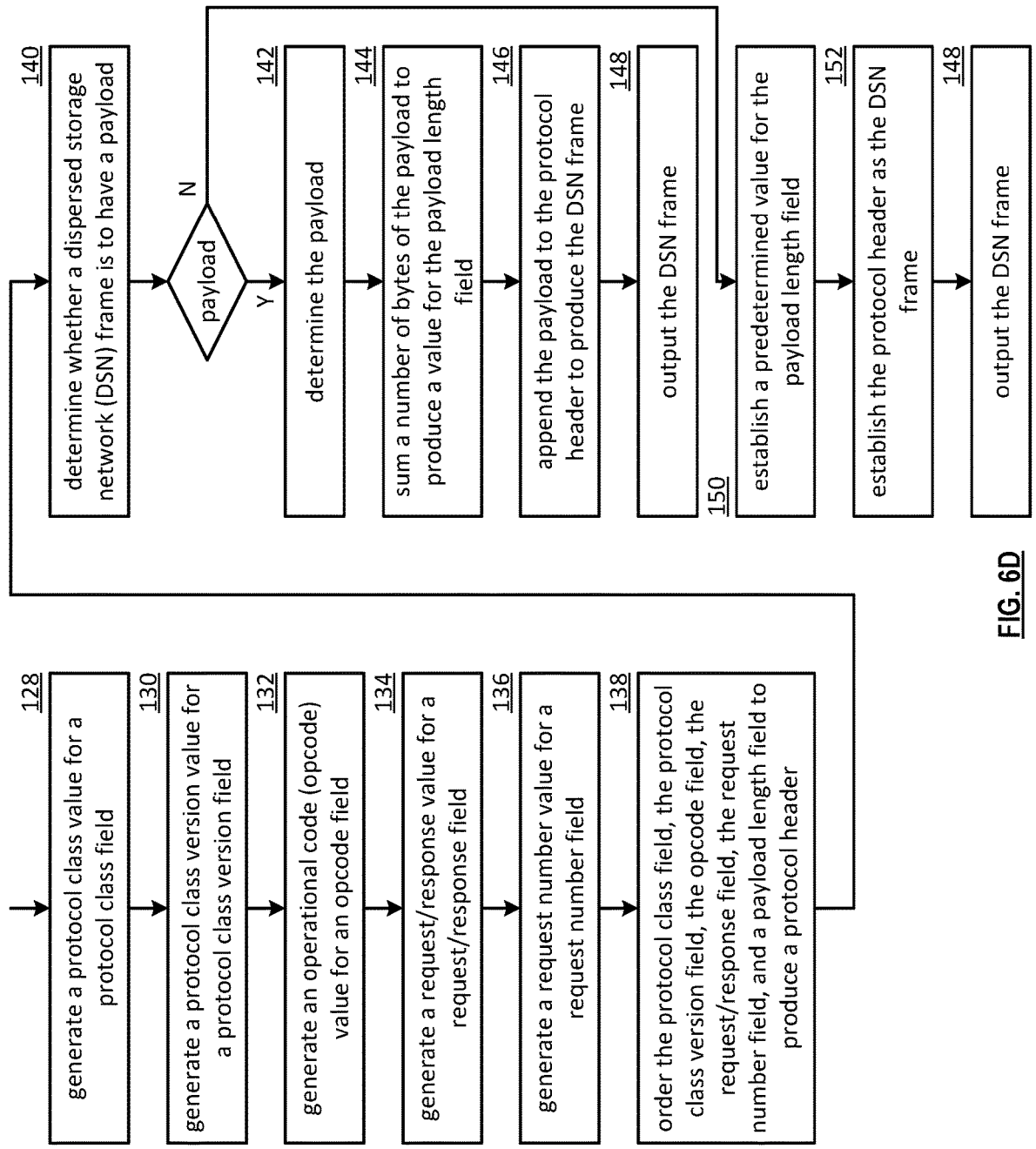
FIG. 6D is a flowchart illustrating an example of generating a protocol header of a dispersed storage network (DSN) frame in accordance with the invention.

FIG. 6D is a flowchart illustrating an example of generating a protocol header of a dispersed storage network (DSN) frame. The method begins with step 128 where a processing module generates values for a protocol class field, a protocol class version field, and an operation code (opcode) field based on an operational function being communicated by the DSN frame. An operational function includes at least one of a read operation, a check operation, a list range operation, a write operation, a checked write operation, a commit operation, a rollback operation, a finalize operation, an undo operation, and a list digest operation.

The processing module generates a protocol class value of the values for the protocol class field by at least one of retrieving the protocol class value from a protocol class list based on the operational function, utilizing the protocol class value of a request DSN frame (e.g., a DSN frame that includes a request message) when the DSN frame is a response DSN frame (e.g., a DSN frame that includes a response message), retrieving the protocol class value from a support protocol class list, retrieving the protocol class value from a unit-module type protocol class list, and extracting the protocol class value from a negotiation result. For example, the processing module generates a protocol class value of 01 when the protocol class value of a corresponding read request DSN frame has value of 01 and the operational function is a read response.

The method continues at step 130 where the processing module generates a protocol class version field. The processing module generates a protocol class version value of the values for the protocol class version field by at least one of utilizing a most recent protocol class version value, retrieving the protocol class version value from a protocol class version list based on the operational function, utilizing the protocol class version value of a request DSN frame when the DSN frame is a response DSN frame, retrieving the protocol class version value from a support protocol class version list, retrieving the protocol class version value from a unit-module protocol class version list, and extracting the protocol class version value from a negotiation result. For example, the processing module generates a protocol class version value of 03 based on retrieving the most recent protocol class version value from the support protocol class version list. As another example, the processing module initiates a negotiation sequence when a protocol class error message is received (e.g., indicating that a present protocol class value and/or a present protocol class version value is unacceptable). A negotiation sequence includes one or more of generating a supported protocol class message, outputting the supported protocol class message, receiving a message that includes a supported protocol class list indicating supported protocol classes and/or protocol class versions, selecting at least one of a supported protocol class value and a protocol class version value from the supported protocol class list, and utilizing the at least one of the supported protocol class value and the supported protocol class version value.

The method continues at step 132 where the processing module generates an operation code field that includes an opcode value based on one or more of an operational function being communicated by the DSN frame, an opcode list, and a predetermination. For example, the processing module generates the operation code field to include an opcode value of 40 hex when the operational function being communicated by the DSN frame is a read request operation, the protocol class field value is 01, and the protocol class version field value is 03.

The method continues at step 134 where the processing module generates a request/response field to indicate a request message for a request message DSN frame or a response message for a response message DSN frame. For example, processing module generates the request/response field to include a value of zero when the DSN frame is the request message DSN frame. As another example, the processing module generates the request/response field to include a value of one when the DSN frame is the response message DSN frame. The method continues at step 136 where the processing module generates a request number field that includes a request number value by at least one of transforming a random number generator output to produce the value, transforming a variable reference number to produce the value (e.g., a hash or block cipher encryption of the variable reference number which increments by one for each new request number value), adding an increment to a previous request number value to produce the value, selecting a predetermined number to produce the value, and utilizing a request number value of a request DSN frame when the DSN frame is a response DSN frame. For example, the processing module generates a request number value of 39,239 in a four byte wide request number field based on the random number generator output. As another example, the processing module generates a request number value of 9,093 when the previous request number value is 9,083 and the increment is 10. As yet another example, the processing module generates a request number value of 277 when the request number value of the request DSN frame is 277 and the DSN frame is a response DSN frame.

The method continues at step 138 where the processing module arranges, in order, the protocol class field, the protocol class version field, the opcode field, the request/response field, the request number field, and a payload length field to produce the protocol header. The method continues at step 140 where the processing module determines whether the DSN frame is to have a payload based on one or more values of one or more of the fields of the protocol header. For example, the processing module determines that the DSN frame is not to have the payload when the opcode value indicates a write commit response operation. As another example, the processing module determines that the DSN frame is to have the payload when the opcode value indicates a read request operation. The method branches to step 150 when the processing module determines that the DSN frame is not to have the payload. The method continues to step 142 when the processing module determines that the DSN frame is to have the payload.

The method continues at step 142 where the processing module determines the payload as one of a request payload for a request message DSN frame and a response payload for a response message DSN frame. A determination may be based on one or more of the operational function, the values for the protocol class field, the protocol class version field, the request/response field, and the opcode field. The method to determine the payload is discussed in greater detail with reference to FIGS. 7A-17C.

The method continues at step 144 where the processing module sums a number of bytes of the payload to produce a value for the payload length field. Alternatively, the processing module determines the value utilizing one or more of a payload length formula and a fixed value. A determination may be based on one or more of the operational function, the values for the protocol class field, the protocol class version field, the request/response field, and the opcode field. For example, the processing module determines to utilize a payload length formula of 8T to produce the value as a four byte payload length field, where T is the number of transaction numbers, when the operational function is a write commit request operation. As another example, the processing module determines to utilize a fixed value of zero when the operational function is an undo write response operation. As yet another example, the processing module determines to sum the number of bytes of the payload to produce the value as a four byte payload length field when the operational function is a checked write request operation.

The method continues at step 146 where the processing module appends the request payload to the protocol header to produce the request message DSN frame for a request message DSN frame or the processing module appends the response payload to the protocol header to produce the response message DSN frame for a response message DSN frame. The method continues at step 148 where the processing module outputs the DSN frame. For example, the processing module sends the request message DSN frame when the operational function is a write request operation. As another example, the processing module sends the response message DSN frame when the operational function is a write response operation.

The method continues at step 150 where the processing module establishes a value for the payload length field as a predetermined value. For example, processing module establishes the value as zero for the payload field when the DSN frame is not to have a payload. The method continues at step 152 where the processing module establishes the protocol header as the DSN frame. The method continues at step 148 where the processing module outputs the DSN frame.

Figure 7B:
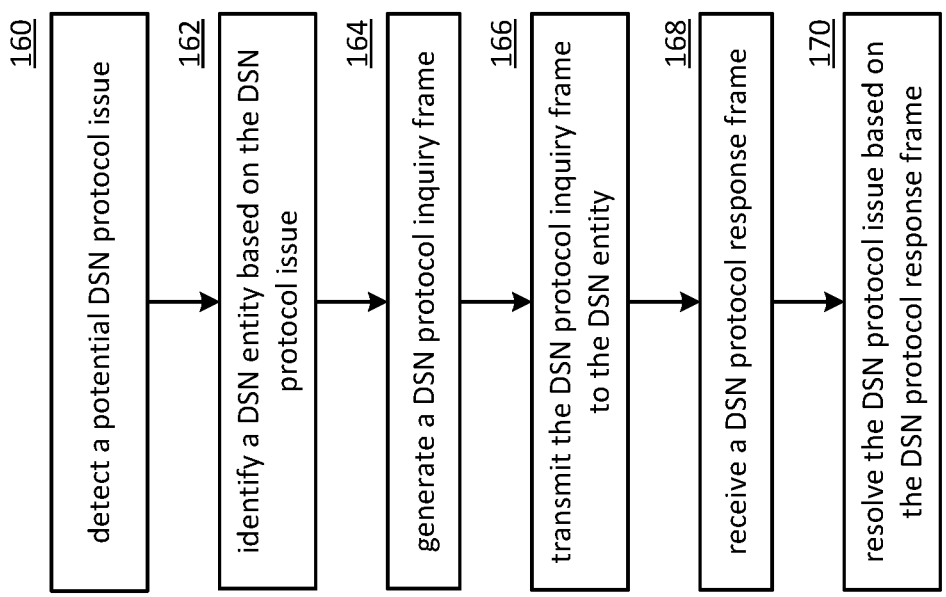
FIG. 7B is a flowchart illustrating an example of resolving a dispersed storage network (DSN) protocol issue in accordance with the invention.
Figure 7A:
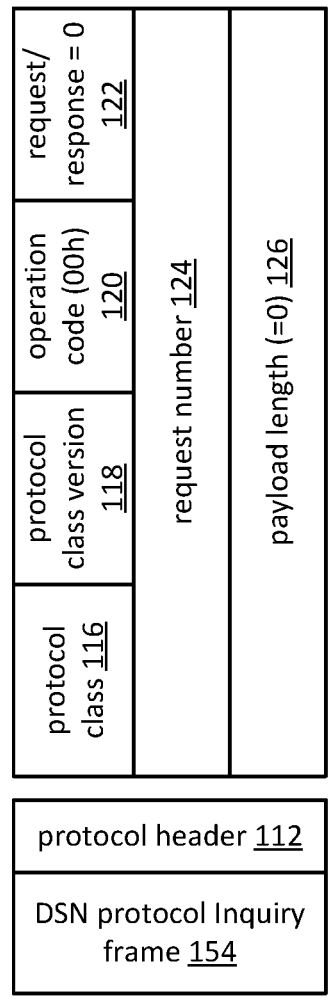
FIG. 7A is a diagram illustrating an example of a dispersed storage network (DSN) protocol inquiry frame format in accordance with the invention.

FIG. 7A is a diagram illustrating an example of a dispersed storage network (DSN) protocol inquiry frame format. A DSN protocol inquiry frame 154 may be associated with resolving a DSN protocol issue, wherein the DSN protocol inquiry frame 154 is sent to a DSN entity associated with the DSN protocol issue. A DSN protocol inquiry frame 154 includes a protocol header 112. A protocol header 112 includes one or more of a protocol class field 116, a protocol class version field 118, an operation code field 120, a request/response field 122, a request number field 124, and a payload length field 126. For example, the operation code field 120 includes an operation code value of 00 hex, the request/response field 122 includes a value of 0 (e.g., to signify a request/inquiry), and the payload length field 126 includes a value of 0 (e.g., no payload). The method to generate and utilize the DSN protocol inquiry frame 154 is described in greater detail with reference to FIG. 7B.

FIG. 7B is a flowchart illustrating an example of resolving a dispersed storage network (DSN) protocol issue. The method begins with step 160 where a processing module detects a potential DSN protocol issue that effects access of dispersed storage error encoded data within a DSN. Such detecting the potential DSN protocol issue includes one or more of detecting a new DSN entity of the DSN, detecting a boot up sequence, receiving a communication failure message, receiving an error message (e.g., an unsupported protocol error), detecting and addressing a decode issue, and detecting a system level operation for a general protocol inquiry of a DSN entity (e.g., any DSN entity activity). A DSN entity includes one of a dispersed storage (DS) unit, a DS processing module, a DS managing module, a DS rebuilding module, and a user device. For example, the processing module detects the potential DSN protocol issue when the processing module detects a new DSN entity (e.g., a recently added element of the DSN system) with no record of protocols supported by the new DSN entity.

Such detecting and addressing the decode issue includes detecting a decode threshold failure regarding a read function of the dispersed storage error encoded data, identifying a set of dispersed storage (DS) units of the DSN, wherein a DS unit of the sets of DS units stores an encoded data slice of the dispersed storage error encoded data and wherein the DSN entity is one of the set of DS units, generating a set of DSN protocol inquiry frames that include the DSN protocol inquiry frame, transmitting the set of DSN protocol inquiry frames to the set of DS units, receiving DSN protocol response frames from at least some of the set of DS units and resolving the DSN protocol issue based on the DSN protocol response frames.

The method continues at step 162 where the processing module identifies a DSN entity based on the DSN protocol issue (e.g., associated or affected by the DSN protocol issue). The method continues at step 164 where the processing module generates a DSN protocol inquiry frame. Such generating of the DSN protocol inquiry frame includes at least one of generating an operation code field to indicate the protocol discovery request operation (e.g., operation code 00h), generating a request number field to include a request number associated with the protocol discovery request operation, generating a protocol class field to indicate a protocol class for the protocol discovery request operation, generating a protocol class version field for the protocol discovery request operation, generating a payload length field of the protocol header to include a predetermined payload length value (e.g., 0), and generating a request/response field to indicate a request message (e.g., 0).

The method continues at step 166 where the processing module transmits the DSN protocol inquiry frame to the DSN entity. The method continues at step 168 where the processing module receives a DSN protocol response frame from the DSN entity. A DSN protocol response frame is discussed in greater detail with reference to FIG. 8A. The method continues at step 170 where the processing module resolves the DSN protocol issue based on the DSN protocol response frame. Such resolving of the DSN protocol issue includes comparing a protocol information received via the DSN protocol response frame with a known protocol information to identify a common protocol and common protocol version, generating a protocol selection frame that identifies the common protocol and the common protocol version, and transmitting the protocol selection frame to the DSN entity.

Figure 8B:
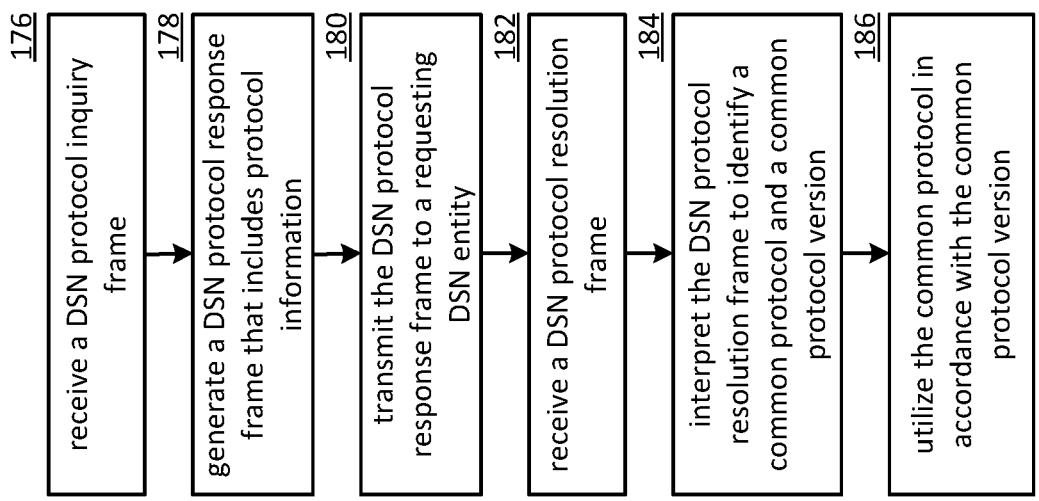
FIG. 8B is a flowchart illustrating another example of resolving a dispersed storage network (DSN) protocol issue in accordance with the invention.
Figure 8A:
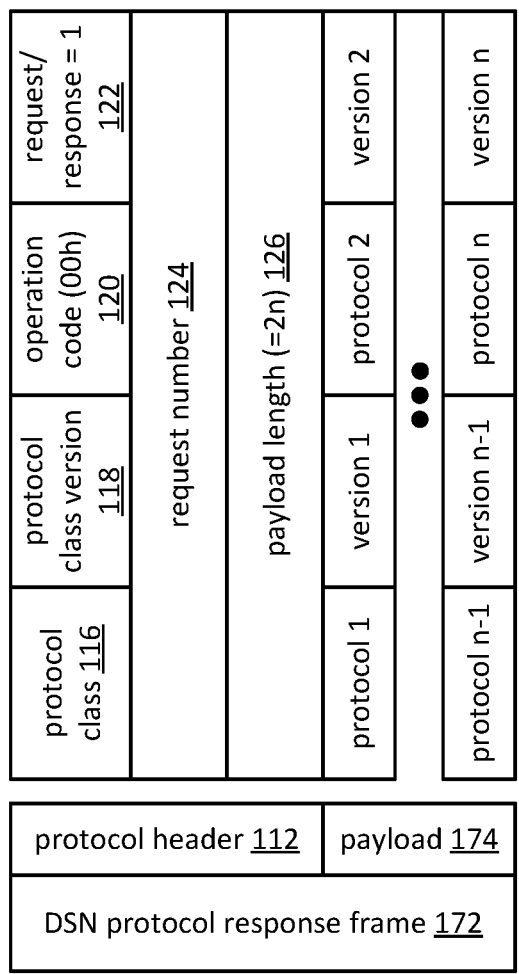
FIG. 8A is a diagram illustrating an example of a dispersed storage network (DSN) protocol response frame format in accordance with the invention.

FIG. 8A is a diagram illustrating an example of a dispersed storage network (DSN) protocol response frame format. A DSN protocol response frame 172 may be associated with resolving a DSN protocol issue, wherein the DSN protocol response frame 172 is sent in response to receiving a DSN protocol inquiry frame. A DSN protocol response frame 172 includes a protocol header 112 and a payload 174. A protocol header 112 includes one or more of a protocol class field 116, a protocol class version field 118, an operation code field 120, a request/response field 122, a request number field 124, and a payload length field 126. For example, the operation code field 120 includes an operation code value of 00 hex, the request/response field 122 includes a value of 1 (e.g., to signify a response), and the payload length field 126 includes a value representing the number of bytes of the payload 174. The method to generate and utilize the DSN protocol response frame 172 is described in greater detail with reference to FIG. 8B.

A payload 174 includes n pairs of supported associated protocol identifiers and version identifiers. As such, the payload length 126 includes a value of 2n when each protocol identifier and each version identifier are one byte each. A protocol identifier 1-n identifies a supported protocol of one or more protocols. A version identifier 1-n identifies a version of the supported protocol. A protocol may be associated with a plurality of versions. For example, protocol field 1 includes protocol XYZ, version field 1 includes version a, protocol field 2 includes protocol XYZ, version field 2 includes version b, protocol field 3 includes protocol XYZ, version field 3 includes version c, when versions a-c of protocol XYZ are supported.

In an example of operation, a DSN protocol inquiry is received and a DSN protocol response frame 172 is generated that includes protocol information. The DSN protocol response frame 172 is transmitted and a DSN protocol resolution frame is received. The DSN protocol resolution frame is interpreted to identify a common protocol and a common protocol version (e.g., common with other entities of a DSN). Next, the common protocol is utilized in accordance with the common protocol version. A method of operation is discussed in greater detail with reference to FIG. 8B.

FIG. 8B is a flowchart illustrating another example of resolving a dispersed storage network (DSN) protocol issue. The method begins at step 176 where a processing module receives a dispersed storage network (DSN) protocol inquiry frame regarding a potential DSN protocol issue that effects access of dispersed storage error encoded data within a DSN. The method continues at step 178 where the processing module generates a DSN protocol response frame that includes protocol information. Such generating of the DSN protocol response frame includes generating a payload and a header. Such generating the payload includes generating the payload to include one or more protocol fields and one or more corresponding version fields, wherein a protocol field of the one or more protocol fields indicates a supported protocol and a corresponding version field of the one or more corresponding version fields indicates a version of the supported protocol. For example, the processing module generates the protocol information (e.g., the one or more protocol fields in the one or more corresponding version fields) based on a protocol table lookup.

Such generating the header includes generating the header by at least one of generating a payload length field of the protocol header to include a payload length that represents a length of the one or more protocol fields and the one or more corresponding version fields, generating a request number field to include a request number associated with a protocol discovery request operation (e.g., copy from corresponding request), generating a protocol class field to indicate a protocol class for the protocol discovery response operation, generating a protocol class version field for the protocol discovery response operation, generating an operation code field to indicate the protocol discovery response operation (e.g., operation code ooh), and generating a request/response field to indicate a response message (e.g., 1).

The method continues at step 180 where the processing module transmits the DSN protocol response frame to a requesting DSN entity (e.g., requesting DSN entity associated with the DSN protocol inquiry frame). The method continues at step 182 where the processing module receives a DSN protocol resolution frame from the requesting DSN entity, wherein the DSN protocol resolution frame includes information regarding resolving the DSN protocol issue. The method continues at step 184 where the processing module interprets the DSN protocol resolution frame to identify a common protocol and a common protocol version. For example, the processing module interprets protocol X1 as the common protocol when protocol X1 is included in the DSN protocol resolution frame and is included in a local supported protocol list. The method continues at step 186 where the processing module utilizes the common protocol in accordance with the common protocol version for access requests regarding the dispersed storage error encoded data (e.g., in association with communications between the processing module and at least one other DSN entity).

Figure 9B:
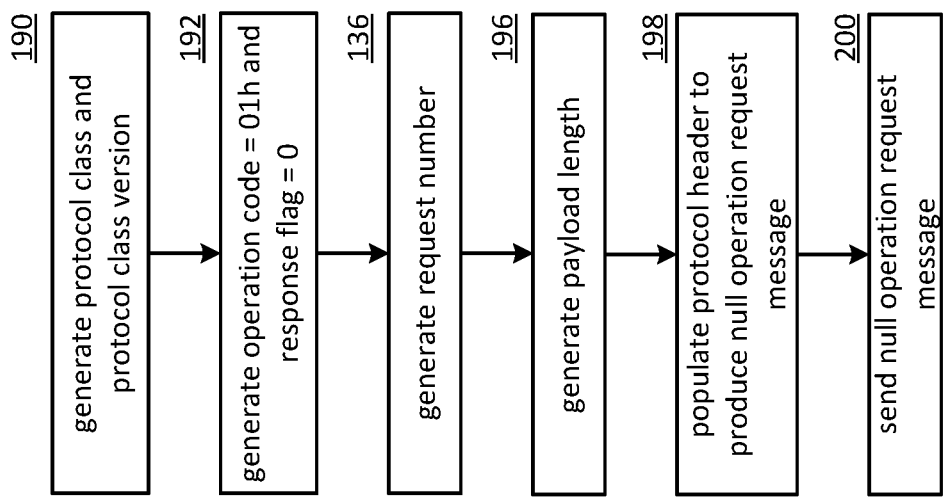
FIG. 9B is a flowchart illustrating an example of generating a null operation request message in accordance with the invention.
Figure 9A:
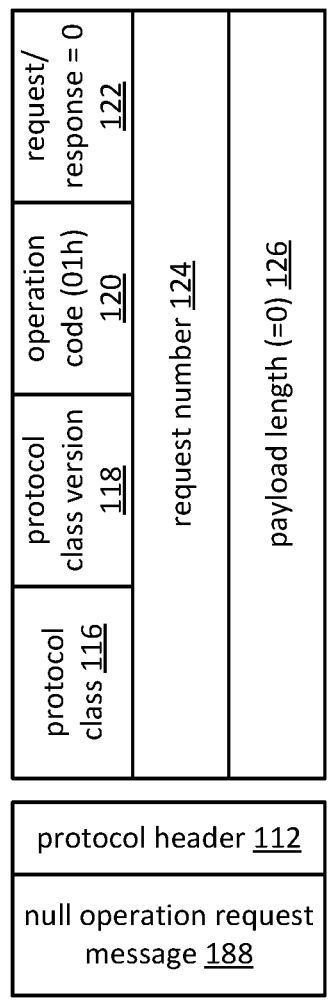
FIG. 9A is a diagram illustrating an example of a null operation request message format in accordance with the invention.

FIG. 9A is a diagram illustrating an example of a null operation request message format of a null operation request message 188. A null operation request message 188 includes a protocol header 112. A protocol header 112 includes one or more of a protocol class field 116, a protocol class version field 118, an operation code field 120, a request/response field 122, a request number field 124, and a payload length field 126. For example, the operation code field 120 includes an operation code value of 01 hex, the request/response field 122 includes a value of 0 (e.g., to signify a request/inquiry), and the payload length field 126 includes a value of 0 (e.g., no payload) when the protocol header 112 is included in the null operation request message 188. The method to generate and utilize the null operation request message 188 is described in greater detail with reference to FIG. 9B.

In an example of operation, a determination is made to generate and send the null operation request message 188 based on one or more of a performance measurement requirement, a communication link integrity verification requirement, and a communication link activity requirement. For example, the determination is made to generate the null operation request message 188 to measure a round trip latency time between at least two elements of a dispersed storage network (DSN) when the performance measurement requirement indicates that a measurement is required. As another example, the null operation request message 188 is generated to verify a communication link to another element of the DSN when the communication link integrity verification requirement indicates that a verification is required. As yet another example, the null operation request message 188 is generated to maintain a minimum level of communication link activity with the other elements of the DSN when the communication link activity requirement indicates that an activity level is required. The null operation request message 188 is generated in accordance with the null operation request message format. The null operation request message 188 is sent to the other element of the DSN. The other element receives the null operation request message 188 and generates a null operation response message. The other element sends the null operation response message back to the sender of the null operation request message 188. The sender of the null operation request message 188 receives the null operation response message and processes the response message further. Such processing of the null operation response message includes one or more of calculating a round-trip performance time, determining whether a communication link is functioning properly, and a null operation (e.g., to ignore the response).

FIG. 9B is a flowchart illustrating an example of generating a null operation request message by a processing module, which include similar steps to FIG. 6D. The method begins with step 190 where a processing module generates a protocol class and a protocol class version based on one or more of a default list for new system elements, a supported protocol indicator, information received in a previous message, a list, a predetermination, a command, and a protocol table lookup when the processing module determines to generate and send the null operation request message. For example, the processing module may generate the protocol class and protocol class version as 01 hex when the processing module determines that there is only one supported protocol class and one supported protocol class version as indicated by a table lookup.

The method continues at step 192 where the processing module generates an operation code and a response flag based on one or more of the protocol class, the protocol class version, information received in a previous message, a list, a task identifier, a predetermination, a command, and a table lookup. For example, the processing module generates the operation code as 01 hex when the processing module receives a command to execute a null operation request sequence. At step 192, the processing module generates the response flag as zero when the processing module determines that this message is a request message based on the command. The method continues at step 136 of FIG. 6D where the processing module generates a request number.

The method continues at step 196 where the processing module determines a payload length based on one or more of an opcode to payload length lookup table, the opcode, a calculation, the number of bytes in the payload if any, a formula, a predetermination, a message, and a command. For example, the processing module determines the payload length to be zero when the processing module looks up a payload length in the opcode to payload length lookup table based on the current opcode. As another example, the processing module calculates the payload length to be zero by counting the number of bytes of the payload (e.g., zero since no payload).

The method continues at step 198 where the processing module populates the request message protocol header and payload, if any, to produce the null operation request message in accordance with the null operation request message format. The method continues at step 200 where the processing module sends the null operation request message to a target system element. The target system element receives the null operation request message and forms a null operation response message. The target system element sends the null operation response message to the processing module. The processing module receives the null operation response message and processes the response message. The format of the null operation response message is discussed in greater detail with reference to FIG. 10A. The method of operation of generating and sending the null operation response message is discussed in greater detail with reference to FIG. 10B.

FIG. 10A is a diagram illustrating an example of a null operation response message format of a null operation response message 202. A null operation response message 202 includes a protocol header 112. A protocol header 112 includes one or more of a protocol class field 116, a protocol class version field 118, an operation code field 120, a request/response field 122, a request number field 124, and a payload length field 126. For example, the operation code field 120 includes an operation code value of 01 hex, the request/response field 122 includes a value of 1 (e.g., to signify a response), and the payload length field 126 includes a value of 0 (e.g. no payload) when the protocol header 112 is included in the null operation response message 202. The method to generate and utilize the null operation response message 202 is described in greater detail with reference to FIG. 10B.

In an example of operation, a null operation response message is generated in accordance with the null operation response message format and sent to a requesting element of a dispersed storage network (DSN) when a null operation request message is received from the requesting element.

FIG. 10B is a flowchart illustrating an example of generating a null operation response message, which include similar steps to FIG. 6D. The method begins with step 204 where a processing module generates a protocol class and a protocol class version based on one or more of a default list for new system elements, a supported protocol indicator, information received in a previous message, a list, a predetermination, a command, and a protocol table lookup when the processing module determines to generate and send the null operation response message (e.g., based on receiving a null operation request message). For example, the processing module may generate the protocol class and protocol class version as 01 hex when the processing module determines that there is only one supported protocol class and one supported protocol class version as indicated by a table lookup.

The method continues at step 206 where the processing module generates an operation code and a response flag based on one or more of the protocol class, the protocol class version, information received in a previous message, a list, a task identifier, a predetermination, a command, and a table lookup. For example, the processing module generates the operation code as 01 hex when the processing module receives a command to execute a null operation response sequence. At step 206, the processing module generates the response flag as one when the processing module determines that this message is a response message based on the command. The method continues at step 136 of FIG. 6D where the processing module generates a request number (e.g., same as a request number from a corresponding null operation request message).

The method continues at step 210 where the processing module determines a payload length based on one or more of an opcode to payload length lookup table, the opcode, a calculation, the number of bytes in a payload if any, a formula, a predetermination, a message, and a command. For example, the processing module determines the payload length to be zero when the processing module looks up a payload length in the opcode to payload length lookup table based on the current opcode. As another example, the processing module calculates the payload length to be zero by counting the number of bytes of the payload (e.g., zero since no payload).

The method continues at step 212 where the processing module populates a response message protocol header and the payload, if any, to produce the null operation response message in accordance with the null operation response message format. The method continues at step 214 where the processing module sends the null operation response message to a requesting system element.

Figure 11A:
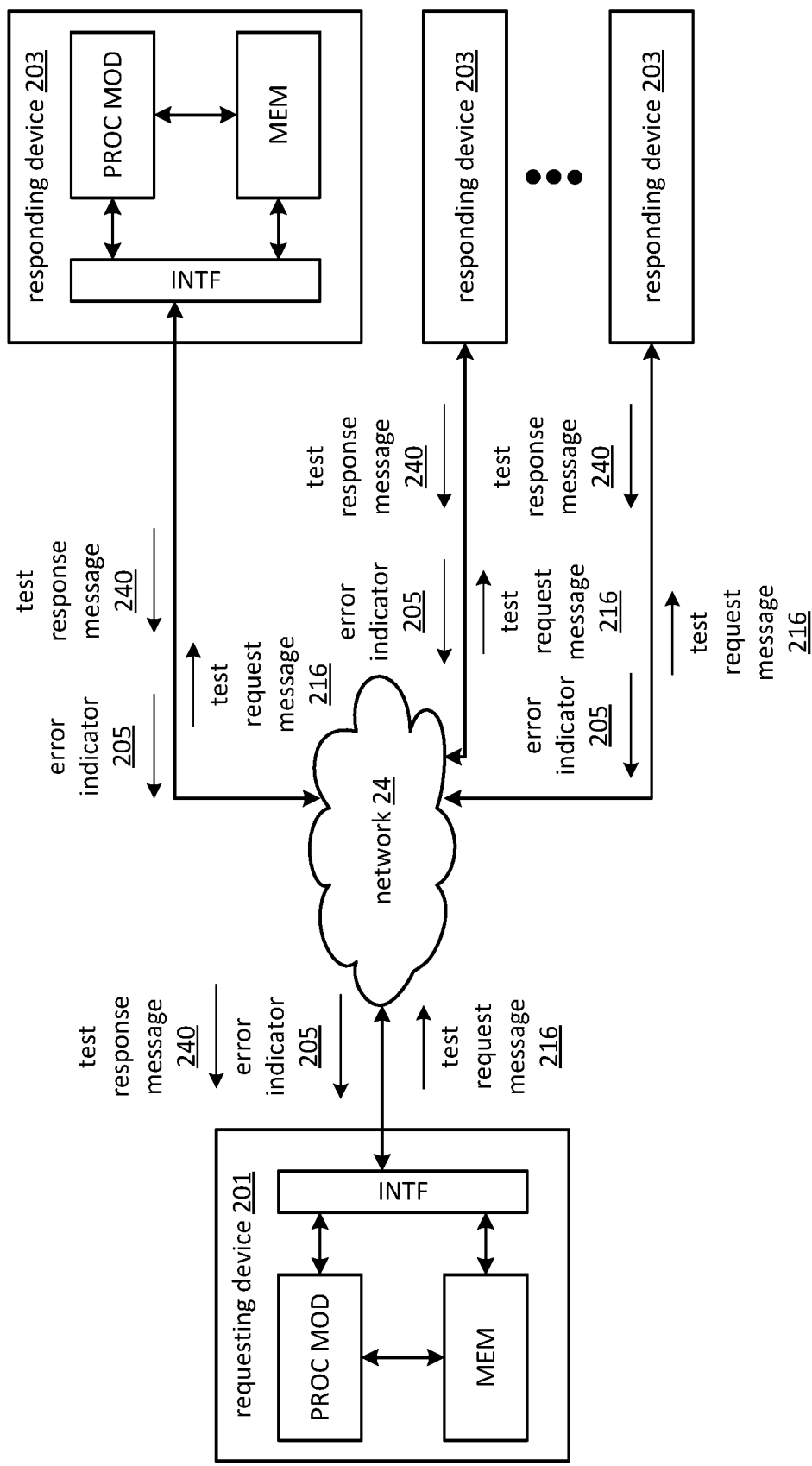
FIG. 11A is a schematic block diagram of an embodiment of a dispersed storage network in accordance with the invention.

FIG. 11A is a schematic block diagram of an embodiment of a dispersed storage network (DSN) that includes a requesting device 201, a network 24 of FIG. 1, and one or more responding devices 203. Each of the requesting device 201 and the one or more responding devices 203 may be implemented utilizing at least one of a dispersed storage (DS) processing unit, a DS processing module, a DS managing unit, a DS managing module, a storage integrity processing unit, a DS rebuilding module, a DS unit, and a user device. For example, the requesting device 201 is implemented as the DS processing unit and the one or more responding devices 203 are implemented as one or more DS units. Each of the requesting device 201 and the one or more responding devices 203 includes a processing module (PROC MOD), a memory (MEM), and an interface (INTF). The memory includes one or more of a memory device, a memory array, a solid state memory device, a magnetic disk memory device, and an optical disc memory device. The interface may be implemented as at least one of a DSN interface 32 of FIG. 1 and an interface 30 of FIG. 1.

The DSN performs four primary functions including a first primary function to identify the one or more responding devices 203 of the DSN potentially contributing to a DSN performance issue, a second primary function to determine a performance test, a third primary function to execute the performance test, and a fourth primary function to resolve the DSN performance issue. The one or more responding devices 203 of the DSN includes one or more devices 203 and may be referred to interchangeably with these terms henceforth. The DSN performance issue includes an issue associated with a performance metric of the DSN. The DSN performance issue includes a condition when an actual performance metric (e.g., measured, detected) deviates from a corresponding goal performance metric by more than a threshold amount. For example, a communication DSN performance issue occurs when an actual communication performance metric indicates that 90% of communication messages are correctly transferred between devices of the DSN, a corresponding goal communication performance metric indicates that 99.99% of the communication messages are expected to be correctly transferred between the devices of the DSN, and a communication threshold amount is 1%.

The first primary function to identify the one or more devices 203 of the DSN potentially contributing to the DSN performance issue includes a series of identifying steps. A first identifying step includes the processing module of the requesting device 201 detecting the DSN performance issue. The processing module of the requesting device 201 detects the DSN performance issue based on one or more of a variety of detecting approaches. A first detecting approach includes the processing module detecting (e.g., receive an error message, perform a test) a communication error to, from, or between the one or more devices 203. For example, the processing module receives, via the network 24 and the interface of the requesting device 201, an error indicator 205 that includes a communication error message from a second responding device 203 of the one or more devices 203 indicating that a communication message failure has occurred. A second detecting approach includes the processing module detecting a storage error indication (e.g., receiving a storage error message, performing a storage test) regarding the one or more devices 203. For example, the processing module receives the error indicator 205 that includes a storage error message.

A third detecting approach includes the processing module detecting a reading error indication (e.g., receive unfavorable read slice response message as the error indicator 205) regarding the one or more devices 203. A fourth detecting approach includes the processing module detecting the DSN performance issue in response to performing a general test (e.g., testing for storage capability, testing for writing capability, testing for reading capability) in accordance with a DSN test schedule. A fifth detecting approach includes the processing module detecting a reliability issue regarding the one or more devices 203. For example, the processing module compares received reliability values as the error indicator 205 from each of the one or more devices 203 and identifies the reliability issue when one received reliability value varies by more than a threshold level from an average of the received reliability values. A sixth detecting approach includes the processing module receiving, via the interface of the requesting device 201, the error indicator 205 that includes a potential failing performance indicator regarding the one or more devices 203. For example, a second responding device 203 of the one or more devices 203 detects a magnetic disk drive failure and sends the potential failing performance indicator to the processing module via the network 24.

A second identifying step of the series of identifying steps includes the processing module identifying the one or more devices 203 of the DSN potentially contributing to the DSN performance issue. The processing module of the requesting device 201 identifies the one or more devices 203 by one or more of a variety of identifying approaches. When the DSN performance issue is based on a communication error, a first identifying approach includes the processing module identifying the one or more devices 203 based on a failure to send a communication or to acknowledge receipt of a communication. When the DSN performance issue is based on a storage error, a second identifying approach includes the processing module identifying the one or more devices 203 based on a failure to provide confirmation of successfully completing a storage request. When the DSN performance issue is based on a read error, a third identifying approach includes the processing module identifying the one or more devices 203 based on a failure to provide retrieved data in accordance with a read request. A fourth identifying approach includes the processing module receiving, via the interface of the requesting device 201, the error indicator 205 that includes a message identifying the one or more devices as having a potential reliability issue. A fifth identifying approach includes the processing module receiving, via the interface of the requesting device 201, the error indicator 205 that includes a message identifying the one or more devices as having a potential performance issue.

The second primary function to determine the performance test includes a series of determining steps. In a first determining step, the processing module of the requesting device 201, for a device 203 of the identified one or more devices 203, determines a potential performance issue of the device 203 based on how the device is potentially contributing to the DSN performance issue (e.g., based on the series of identifying steps). In a second determining step, the processing module determines a performance test based on the potential performance issue. For example, the processing module determines to utilize a latency test when the potential performance issue is related to access delay. As another example, the processing module determines to utilize a bandwidth test when the potential performance issue is related to processing capacity. In a third determining step, the processing module generates a test request message 216 (e.g., a message) that includes a protocol header and a payload, where the protocol header includes an indication to identify the message as the test request message 216 and the payload includes test information specific for the device to execute the performance test. The generating of the test request message 216 is described in further detail with reference to FIG. 11B.

The third primary function to execute the performance test includes a series of executing steps. In a first executing step, the processing module of the requesting device 201 sends, via the interface of the requesting device 201, the test request message 216 to the device 203. In a second executing step, the processing module of the requesting device 201 receives, from the device 203 via the interface of the requesting device 201, a test response message 240 (e.g., a response message) that includes a response header and a response payload, where the response header includes an indication to identify the response message as the test response message 240 and the response payload includes a specific test result data generated based on the test information. The test response message 240 is described in greater detail with reference to FIG. 11B and FIG. 12A.

The fourth primary function to resolve the DSN performance issue includes a resolving step. The resolving step includes the processing module of the requesting device 201 determining, based on the specific test result data, whether the device 203 has the potential performance issue and is contributing to the DSN performance issue. The DSN may further determine a second potential performance issue for a second device 203 of the identified one or more devices 203. The second primary function to determine the performance test further includes a series of further determining steps for the second device 203 of the identified one or more devices 203. In a first further determining step, the processing module of the requesting device 201 determines a second potential performance issue of the second device 203 based on how the second device is potentially contributing to the DSN performance issue. In a second further determining step, the processing module determines a second performance test based on the second potential performance issue. In a third further determining step, the processing module generates a second test request message 216 (e.g., a second message) that includes a second protocol header and a second payload, where the second protocol header includes an indication to identify the second message as the test request message 216 and the second payload includes second test information specific for the second device 203 to execute the second performance test.

The third primary function to execute the performance test further includes a series of further executing steps for the second device 203 of the identified one or more devices 203. In a first further executing step, the processing module of the requesting device 201 sends, via the interface of the requesting device 201, the second test request message 216 to the second device 203. In a second further executing step, the processing module of the requesting device 201 receives, from the second device 203 via the interface of the requesting device 201, a second test response message 240 (e.g., a second response message) that includes a second response header and a second response payload, where the second response header includes an indication to identify the second response message as the test response message 240 and the second payload includes a second specific test result data generated based on the second test information.

The fourth primary function to resolve the DSN performance issue further includes a series of further resolving steps for the second device 203 of the identified one or more devices 203. In a first further resolving step, the processing module of the requesting device 201 determines, based on the second specific test result data, whether the second device 203 has the second potential performance issue and is contributing to the DSN performance issue. In a second further resolving step, the processing module of the requesting device 201, when the first and second potential performance issues are not individually contributing to the DSN performance issue, determines whether a combination of the first and second potential performance issues are collectively contributing to the DSN performance issue. For example, the first and second potential performance issues correspond to slice level access latency performance that is substantially aligned with a slice level latency goal and the combination of the first and second potential performance issues contribute to data segment level access latency performance that is not substantially aligned with a data segment level latency goal.

Figure 11B:
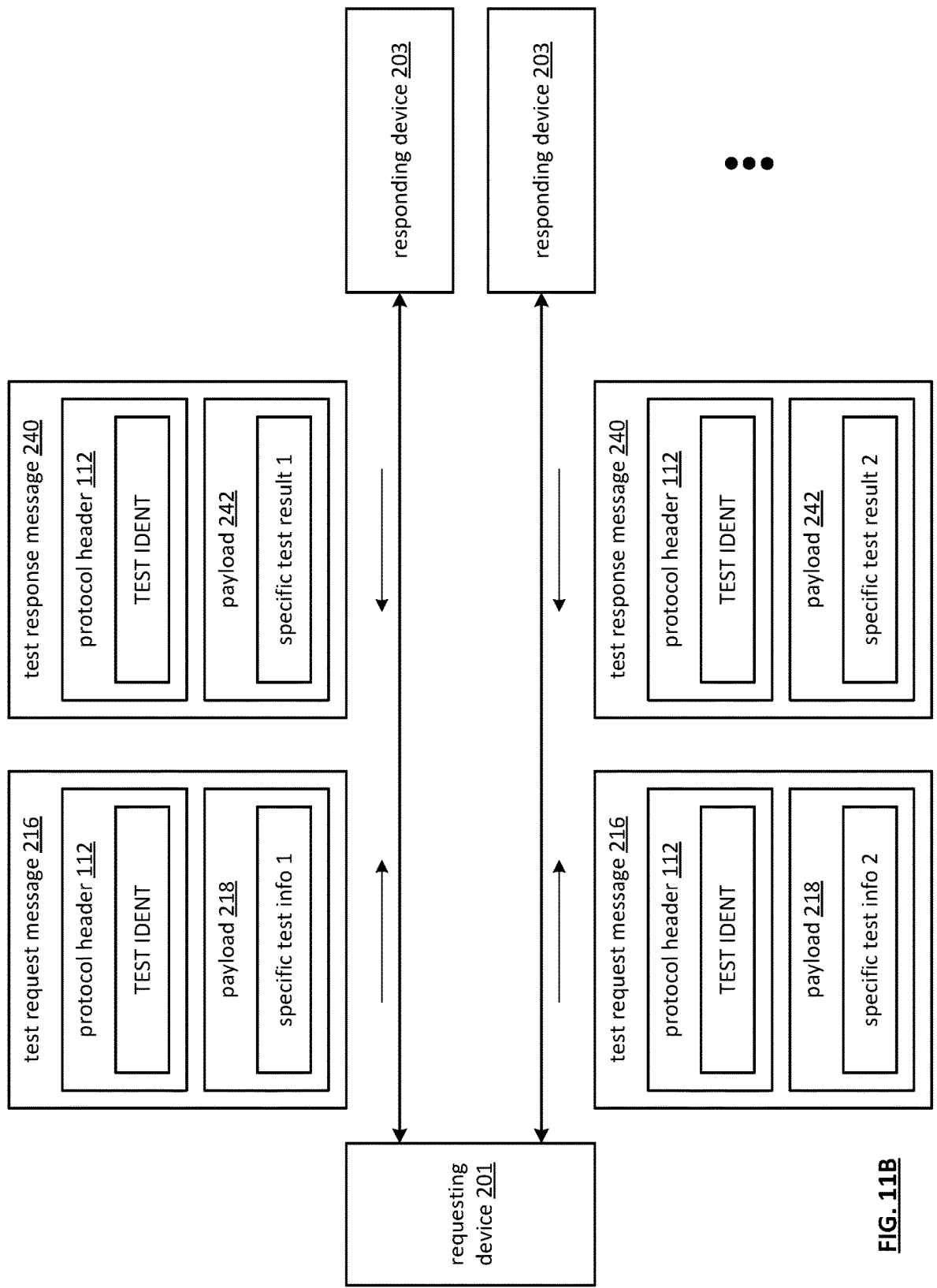
FIG. 11B is a schematic block diagram of another embodiment of a dispersed storage network in accordance with the invention.

FIG. 11B is a schematic block diagram of another embodiment of a dispersed storage network that includes the requesting device 201 and the one or more responding devices 203 of FIG. 11A. The requesting device 201 functions to perform a performance test on the one or more responding devices 203. The performing of the performance test includes a series of testing steps. In a first testing step, the requesting device 201 generates, for each responding device 203 of the one or more responding devices 203, a test request message 216. In a second testing step, the requesting device 201 sends the test request message 216 to the responding device 203. In a third testing step, the requesting device 201 receives, from each responding device 203 of the one or more responding devices 203, a test response message 240.

The requesting device 201 generates the test request message 216 to include a protocol header 112 of the test request message 216 and a payload 218. The protocol header 112 of the test request message 216 includes, for the test request message 216, a test identifier (TEST IDENT) where the test identifier includes an indication to identify the test request message 216. The payload 218 includes specific test information for a corresponding responding device 203 to execute the performance test. For example, the requesting device 201 generates the payload 218 of a first test request message 216 to include specific test information 1 for a first responding device 203 and generates the payload 218 of a second test request message 216 to include specific test information 2 for a second responding device 203.

Each responding device 203 generates a corresponding test response message 240 to include a protocol header 112 of the test response message 240 and a payload 242. The protocol header 112 of the test response message 240 includes a test identifier where the test identifier includes an indication to identify the test response message 240. The payload 242 includes specific test result data generated based on corresponding specific test information. For example, the first responding device 203 generates a payload 242 of a first test response message 240 to include specific test result data 1 based on the specific test information 1 and the second responding device 203 generates a payload 242 of a second test response message 240 to include specific test result data 2 based on the specific test information 2. For instance, specific test result data 1 includes a requested number of random bytes of data when the specific test information 1 indicates to return the requested number of random bytes. As another instance, specific test result data 1 includes test bytes when the specific test information 1 includes the test bytes and an indication to return the test bytes as the specific test result data 1.

The requesting device 201 generates the test request message 216 by generating the protocol header 112 to include an operation code field to identify the test request message 216 as a test message, a request/response field to identify the test request message 216 as a request message, a request number field to identify the message as a particular test request message 216, and a payload length field. The requesting device 201 further generates the test request message 216 by at least one of a variety of payload generating approaches. A first generating approach includes generating the payload to test data transfer speed, where the payload includes a response length field to indicate a desired length of the response message or portion thereof and the test information specific for a corresponding responding device 203 that includes an indication of the data transfer speed test and minimal data for transferring between the responding device 203 and the requesting device 201 to test speed. A second generating approach includes generating the payload to test data transfer bandwidth, where the payload includes the response length field to indicate the desired length of the test response message 240 or portion thereof and the test information specific for the responding device 203 that includes an indication of the data transfer bandwidth test and a large amount of data for transferring between the responding device 203 and the requesting device 201 to test bandwidth.

A third generating approach includes generating the payload to test data transfer latency, where the payload includes the response length field to indicate the desired length of the test response message 240 or portion thereof and the test information specific for the responding device 203 that includes an indication of the data transfer latency test and data for transferring between the responding device 203 and the requesting device 201 to test latency. A fourth generating approach includes generating the payload to test error rate of data transfer, where the payload includes the response length field to indicate the desired length of the test response message 240 or portion thereof and the test information specific for the responding device 203 that includes an indication of the data transfer error rate test and control data for transferring between the responding device 203 and the requesting device 201 to test error rate.

Figure 11C:
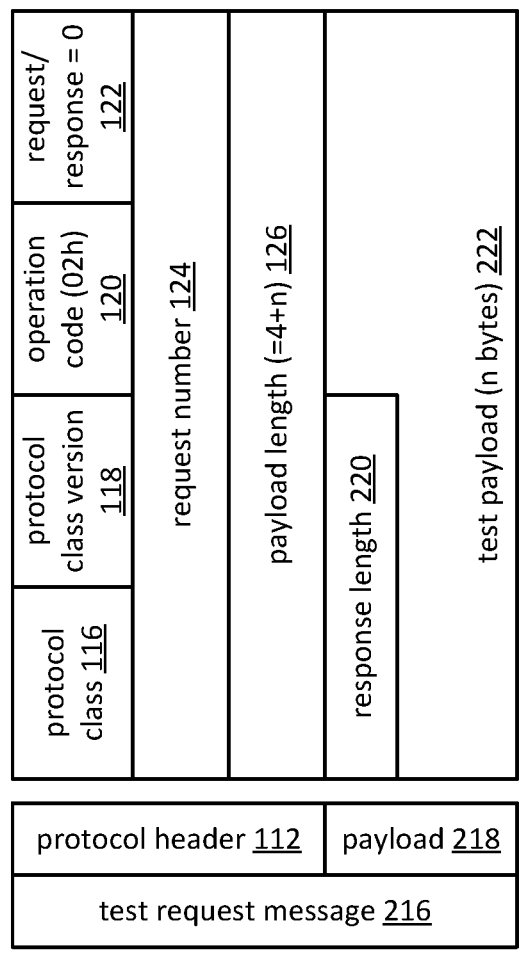
FIG. 11C is a diagram illustrating an example of a test request message format in accordance with the invention.

FIG. 11C is a diagram illustrating an example of a test request message format of a test request message 216. The test request message 216 includes a protocol header 112 and a payload 218. A protocol header 112 includes one or more of a protocol class field 116, a protocol class version field 118, an operation code field 120, a request/response field 122, a request number field 124, and a payload length field 126. For example, the operation code field 120 includes an operation code value of 02 hex, the request/response field 122 includes a value of 0 (e.g., to signify a request), and the payload length field 126 includes a value representing the number of bytes of the payload 218.

The payload 218 includes test information including a response length field 220 and a test payload field 222. The test payload field 222 includes test data to be utilized in a test. The test may include one or more of measuring a speed of data transfer, measuring a bandwidth of data transfer, measuring a latency of data transfer, and measuring an error rate of data transfer. A volume of the test payload 222 may be relatively small for a test to measure a speed of data transfer and measuring latency of data transfer. Another volume of the test payload 222 may be relatively large for tests of measuring bandwidth of data transfer and measuring error rate of data transfer. The test data may include random data or determined test data in accordance with a test data determination method. For example, determined test data includes predetermined text strings to enable error rate determination by comparing test payload data sent in the test request message to subsequently received test payload data from a corresponding test response message. The response length field 220 includes a requested value of a number of bytes of a response test payload.

In an example of operation, a determination is made to initiate a test sequence. A determination may be based on one or more of a communications error message, a test schedule, an error indicator, a performance indicator, a reliability indicator, a predetermination, a message, and a command. For example, the determination is made to initiate the test sequence when an above average number of communication errors have occurred within a time period. Next, test objectives and/or a test method is determined. For example, test objectives are determined based on an error rate of data transfer when communication errors have occurred.

A test method is determined to include sending a relatively large predetermined test payload to another element of a dispersed storage network (DSN) such that the other element will return a test payload. The test request message 216 is generated in accordance with the test request message format and sent to the other element of the DSN. The test request message 216 is received by the other element and the other element generates a test response message in accordance with a test response message format, as discussed in greater detail with reference to FIG. 12A. The test response message is sent to a requesting entity. The test response message is received by the requesting entity and processed in accordance with the test method to determine whether a test result is favorable. For example, a test response payload of the test response message is compared with the test payload of the test request message 216 to determine an error rate of data transfer.

Figure 11D:
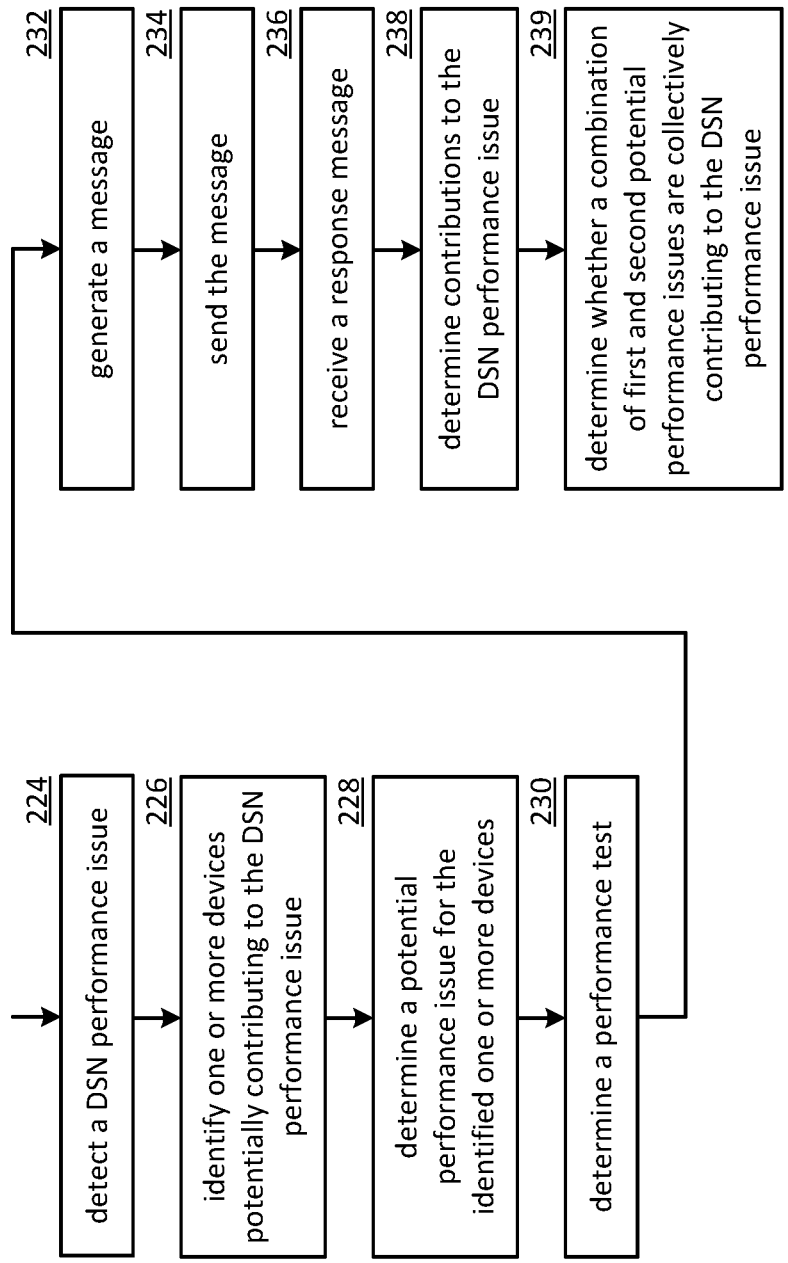
FIG. 11D is a flowchart illustrating an example of performing a test in accordance with the invention.

FIG. 11D is a flowchart illustrating an example of performing a test. The method begins at step 224 where a processing module (e.g., of a requesting device of one or more requesting devices a dispersed storage network (DSN)) detects a DSN performance issue. The detecting the DSN performance issue may be based on one or more detecting approaches. A first detecting approach includes detecting (e.g., receive an error message, perform a test) a communication error to, from, or between one or more devices of the DSN. A device of the one or more devices includes one of a dispersed storage (DS) unit, a DS processing unit, a DS processing module, a DS managing module, a DS rebuilding module, and a user device. A second detecting approach includes detecting a storage error indication regarding the one or more devices. A third detecting approach includes detecting a reading error indication regarding the one or more devices. A fourth detecting approach includes detecting the DSN performance issue in response to performing a general test in accordance with a DSN test schedule. A fifth detecting approach includes detecting a reliability issue regarding the one or more devices. A sixth detecting approach includes receiving a potential failing performance indicator regarding the one or more devices.

When the DSN performance issue is detected, the method continues at step 226 where the processing module identifies the one or more devices of the DSN potentially contributing to the DSN performance issue. The identifying the one or more devices includes one or more of a variety of approaches. When the DSN performance issue is based on a communication error, a first approach includes identifying the one or more devices based on a failure to send a communication or to acknowledge receipt of a communication. When the DSN performance issue is based on a storage error, a second approach includes identifying the one or more devices based on a failure to provide confirmation of successfully completing a storage request. When the DSN performance issue is based on a read error, a third approach includes identifying the one or more devices based on a failure to provide retrieved data in accordance with a read request. A fourth approach includes receiving a message identifying the one or more devices as having a potential reliability issue. A fifth approach includes receiving a message identifying the one or more devices as having a potential performance issue.

The method continues at step 228 where the processing module determines a potential performance issue for devices of the identified one or more devices. For a device of the identified one or more devices, the processing module determines the potential performance issue of the device based on how the device is potentially contributing to the DSN performance issue (e.g., based on one or more of the detecting the DSN performance issue and the identifying the device). For a second device of the identified one or more devices, the processing module further determines a second potential performance issue of the second device based on how the second device is potentially contributing to the DSN performance issue.

The method continues at step 230 where the processing module determines a performance test for the one or more devices. For the device of the identified one or more devices, the processing module determines the performance test based on the potential performance issue. For the second device of the identified one or more devices, the processing module further determines a second performance test based on the second potential performance issue.

The method continues at step 232 where the processing module generates a message. For the device of the identified one or more devices, the processing module generates the message that includes a protocol header and a payload, where the protocol header includes an indication to identify the message as a test request message and the payload includes test information specific for the device to execute the performance test. For the second device of the identified one or more devices, the processing module further generates a second message that includes a second protocol header and a second payload, where the second protocol header includes an indication to identify the second message as a test request message and the second payload includes second test information specific for the second device to execute the second performance test.

The generating the message further includes generating the protocol header to include an operation code field to identify the message as a test message, a request/response field to identify the message as a request message, a request number field to identify the message as a particular test request message, and a payload length field. The generating the message further includes at least one of a variety of generating approaches. A first generating approach includes generating the payload to test data transfer speed, where the payload includes a response length field to indicate a desired length of the response message or portion thereof and the test information specific for the device that includes an indication of the data transfer speed test and minimal data for transferring between the device and the one or more requesting devices to test speed. A second generating approach includes generating the payload to test data transfer bandwidth, where the payload includes the response length field to indicate the desired length of the response message or portion thereof and the test information specific for the device that includes an indication of the data transfer bandwidth test and a large amount of data for transferring between the device and the one or more requesting devices to test bandwidth.

A third generating approach of the variety of generating approaches to generate the message includes generating the payload to test data transfer latency, where the payload includes the response length field to indicate the desired length of the response message or portion thereof and the test information specific for the device that includes an indication of the data transfer latency test and data for transferring between the device and the one or more requesting devices to test latency. A fourth generating approach includes generating the payload to test error rate of data transfer, where the payload includes the response length field to indicate the desired length of the response message or portion thereof and the test information specific for the device that includes an indication of the data transfer error rate test and control data for transferring between the device and the one or more requesting devices to test error rate.

The method continues at step 234 where the processing module sends the message. For the device of the identified one or more devices, the processing module sends the message to the device. For the second device of the identified one or more devices, the processing module further sends the second message to the second device. The method continues at step 236 where the processing module receives a response message. For the device of the identified one or more devices, the processing module receives, from the device, the response message that includes a response header and a response payload, where the response header includes an indication to identify the response message as a test response message and the payload includes a specific test result data generated based on the test information. For the second device of the identified one or more devices, the processing module further receives, from the second device, a second response message that includes a second response header and a second response payload, wherein the second response header includes an indication to identify the second response message as a test response message and the second payload includes a second specific test result data generated based on the second test information.

The method continues at step 238 where the processing module determines contributions to the DSN performance issue. For the device of the identified one or more devices, the processing module determines, based on the specific test result data, whether the device has the potential performance issue and is contributing to the DSN performance issue. For the second device of the identified one or more devices, the processing further determines, based on the second specific test result data, whether the second device has the second potential performance issue and is contributing to the DSN performance issue. When the first and second potential performance issues are not individually contributing to the DSN performance issue, the method continues at step 239 where the processing module determines whether a combination of the first and second potential performance issues are collectively contributing to the DSN performance issue.

Figure 12B:
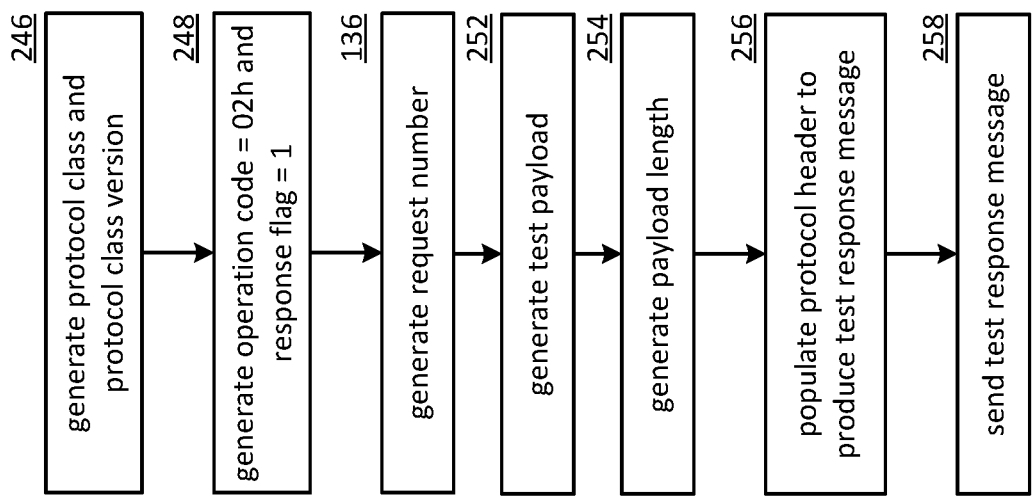
FIG. 12B is a flowchart illustrating an example of generating test response message in accordance with the invention.
Figure 12A:
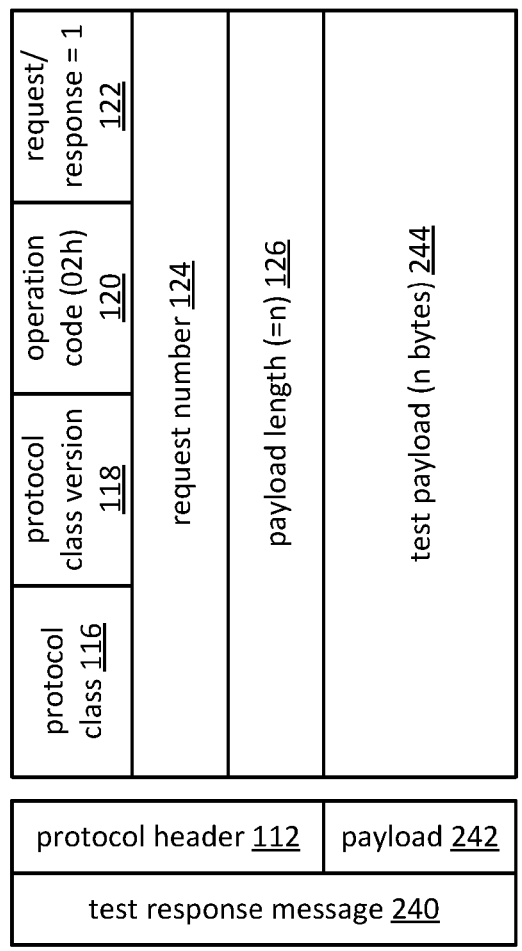
FIG. 12A is a diagram illustrating an example of a test response message format in accordance with the invention.

FIG. 12A is a diagram illustrating an example of a test response message format of a test response message 240. The test response message 240 includes a protocol header 112 and a response payload 242. The protocol header 112 includes one or more of a protocol class field 116, a protocol class version field 118, an operation code field 120, a request/response field 122, a request number field 124, and a payload length field 126. For example, the operation code field 120 includes an operation code value of 02 hex (e.g., for test), the request/response field 122 includes a value of 1 (e.g., to signify a response), and the payload length field 126 includes a value representing the number of bytes of the response payload 242. The method to generate and utilize the test response message 240 is described in greater detail with reference to FIG. 12B.

The response payload 242 includes a test payload field 244 that includes test results data. The test results data includes at least one of random data and test data from a test payload field of a corresponding test request message. The test results data is generated in accordance with a response length value of the corresponding test request message. For example, a received test request message includes a response length value of 1000 bytes and no test data. As such, test data of the test payload field of the test response message 240 is generated to produce 1000 bytes of random testing bytes. As another example, a received test request message includes a response length value of 10,000 bytes and 10,000 bytes of test data. As such, the test data of the test payload field of the test response message 240 is generated utilizing 1000 bytes of test data of the 10,000 bytes from the received test request message.

FIG. 12B is a flowchart illustrating an example of generating a test response message by a processing module, which include similar steps to FIG. 6D. The method begins with step 246 where the processing module generates a protocol class and a protocol class version based on one or more of a default list for new system elements, a supported protocol indicator, information received in a previous message, a list, a predetermination, a command, and a protocol table lookup when the processing module determines to generate and send the test response message. For example, the processing module may generate the protocol class and protocol class version as 01 hex when the processing module determines that there is only one supported protocol class and one supported protocol class version as indicated by a table lookup.

The method continues at step 248 where the processing module generates an operation code for the test response message and a response flag based on one or more of the protocol class, the protocol class version, information received in a previous message, a list, a task identifier, a predetermination, a command, and a table lookup. For example, the processing module generates the operation code as 02 hex when the processing module receives a test request message to execute a test response sequence. At step 248, the processing module further generates a response flag as 1 when the processing module determines that this message is a response message. The method continues at step 136 of FIG. 6D where the processing module generates a request number (e.g., same as a request number of a corresponding test request message).

The method continues at step 252 where the processing module generates a test payload in accordance with the corresponding test request message. For example, the processing module generates n random bytes of test data when a test payload of the corresponding test request message is null and a response length of the corresponding test request message is n bytes. As another example, the processing module generates the test payload as the test payload of the corresponding test request message when the test payload of the corresponding test request message is not null.

The method continues at step 254 where the processing module generates a payload length based on one or more of an opcode-to-payload-length lookup table, the opcode, a calculation, the number of bytes in the payload, a formula, a predetermination, a message, and a command. For example, the processing module generates the payload length as a number of bytes of the test payload. The method continues at step 256 where the processing module populates a request message protocol header and a response payload, to produce the test response message in accordance with a test response message format. The method continues at step 258 where the processing module sends the test response message to a test requesting entity.

FIG. 13A is a diagram illustrating an example of a start transport layer security (TLS) request message format of a start TLS request message 260. A start TLS request message 260 includes a protocol header 112. A protocol header 112 includes one or more of a protocol class field 116, a protocol class version field 118, an operation code field 120, a request/response field 122, a request number field 124, and a payload length field 126. For example, the operation code field 120 includes an operation code value of 10 hex, the request/response field 122 includes a value of 0 (e.g., to signify a request), and the payload length field 126 includes a value of 0 (e.g., no payload) when the protocol header 112 is included in the start TLS request message 260. The method to generate and utilize the start TLS request message 260 is described in greater detail with reference to FIG. 13B.

In an example of operation, a determination is made to generate and send the start TLS request message 260 based on one or more of a security requirement, a communication link integrity requirement, an error message, an intrusion detection indicator, an encrypted connection request, a secure connection table entry, a message, and a command. For example, a determination is made to generate and send the start TLS request message 260 when a local application indicates that an encrypted connection is required between a processing module and another system element. As another example, the determination is made to generate and send the start TLS request message 260 when a secure communication connection is required with at least one other dispersed storage network (DSN) system element as indicated by the secure connection table lookup for the at least one other system element.

In the example of operation continued, the start TLS request message 260 is generated in accordance with the start TLS request message format and sent to the at least one other element of the DSN. The at least one other element receives the start TLS request message 260 and generates a start TLS response message in accordance with a start TLS response message format. The at least one other element sends the start TLS response message to the requesting entity. The start TLS response message is received and processed. Such processing of the start TLS response message includes one or more of activating an encrypted connection mode, retrieving security parameters, determining security parameters, testing the integrity of a communications link, notifying a requesting application that the security process has been initiated, generating a TLS handshake, and sending the TLS handshake. For example, a TLS handshake is generated and sent to the at least one other system element when the start TLS response message is received from the at least one other system element. The other system element receives the TLS handshake and sends a message back to the requesting entity indicating that the at least one other system element is ready to start accepting encrypted traffic. Subsequent communications to the at least one other system element utilizes encrypted communications. The method to generate and send the start TLS request message 260 is discussed in greater detail with reference to FIG. 13B.

FIG. 13B is a flowchart illustrating an example of generating a start transport layer security (TLS) request message, which include similar steps to FIG. 6D. The method begins with step 262 where a processing module generates a protocol class and a protocol class version based on one or more of a default list for new system elements, a supported protocol indicator, information received in a previous message, a list, a predetermination, a command, and a protocol table lookup when the processing module determines to generate and send the start TLS request message. For example, the processing module generates the protocol class and protocol class version as 01 hex when the processing module determines that there is only one supported protocol class and one supported protocol class version as indicated by a table lookup.

The method continues at step 264 where the processing module generates an operation code and a response flag based on one or more of the protocol class, the protocol class version, information received in a previous message, a list, a task identifier, a predetermination, a command, and a table lookup. For example, the processing module generates the operation code as 10 hex when the processing module receives a command to execute a start TLS request sequence. At step 264, the processing module generates the response flag as zero when the processing module determines that this message is a request message based on the command. The method continues at step 136 of FIG. 6D where the processing module generates a request number.

The method continues at step 268 where the processing module determines a payload length based on one or more of an opcode to payload length lookup table, the opcode, a calculation, the number of bytes in the payload if any, a formula, a predetermination, a message, and a command. For example, the processing module determines the payload length to be zero when the processing module looks up a payload length in the opcode to payload length lookup table based on the current opcode. As another example, the processing module calculates the payload length to be zero by counting the number of bytes of the payload (e.g., zero since no payload).

The method continues at step 270 where the processing module populates the request message protocol header and payload, if any, to produce the null operation request message in accordance with the start TLS request message format. The method continues at step 272 where the processing module sends the start TLS request message to a target system element. The target system element receives the start TLS request message and forms a start TLS response message. The target system element sends the start TLS response message to the processing module. The processing module receives the start TLS response message and processes the response message. The format of the start TLS response message is discussed in greater detail with reference to FIG. 14A. The method of operation of generating and sending the start TLS response message is discussed in greater detail with reference to FIG. 14B.

FIG. 14A is a diagram illustrating an example of a start transport layer security (TLS) response message format of a start TLS response message 274. A start TLS response message 274 includes a protocol header 112. A protocol header 112 includes one or more of a protocol class field 116, a protocol class version field 118, an operation code field 120, a request/response field 122, a request number field 124, and a payload length field 126. For example, the operation code field 120 includes an operation code value of 10 hex, the request/response field 122 includes a value of 1 (e.g., to signify a response), and the payload length field 126 includes a value of 0 (e.g. no payload) when the protocol header 112 is included in the start TLS response message 274. The method to generate and utilize the start TLS response message 274 is described in greater detail with reference to FIG. 14B.

In an example of operation, a start TLS response message 274 is generated in accordance with the start TLS response message format and sent to a requesting element of a dispersed storage network (DSN) when a corresponding start TLS request message is received from the requesting element. In addition, the processing module may apply a secure sockets layer and/or a transport layer security filter to a connection with the requesting element.

FIG. 14B is a flowchart illustrating an example of generating a start transport layer security (TLS) response message, which include similar steps to FIG. 6D. The method begins with step 276 where a processing module generates a protocol class and a protocol class version based on one or more of a default list for new system elements, a supported protocol indicator, information received in a previous message, a list, a predetermination, a command, and a protocol table lookup when the processing module determines to generate and send the start TLS response message (e.g., based on receiving a start TLS request message and being equipped for secure operations). For example, the processing module may generate the protocol class and protocol class version as 01 hex when the processing module determines that there is only one supported protocol class and one supported protocol class version as indicated by a table lookup.

The method continues at step 278 where the processing module generates an operation code and a response flag based on one or more of the protocol class, the protocol class version, information received in a previous message, a list, a task identifier, a predetermination, a command, and a table lookup. For example, the processing module generates the operation code as 10 hex when the processing module receives a command to execute a start TLS response sequence. At step 278, the processing module generates the response flag as one when the processing module determines that this message is a response message based on the command. The method continues at step 136 of FIG. 6D where the processing module generates a request number (e.g., same as a request number from a corresponding start TLS request message).

The method continues at step 282 where the processing module determines a payload length based on one or more of an opcode to payload length lookup table, the opcode, a calculation, the number of bytes in a payload if any, a formula, a predetermination, a message, and a command. For example, the processing module determines the payload length to be zero when the processing module looks up a payload length in the opcode to payload length lookup table based on the current opcode. As another example, the processing module calculates the payload length to be zero by counting the number of bytes of the payload (e.g., zero since no payload).

The method continues at step 284 where the processing module populates a response message protocol header and the payload, if any, to produce the start TLS response message in accordance with a start TLS response message format. The method continues at step 286 where the processing module sends the start TLS response message to a requesting system element.

FIG. 15A is a diagram illustrating an example of a storage network authentication protocol (SNAP) request message format of a dispersed storage network (DSN) authentication request frame 288. A DSN authentication request frame 288 includes a protocol header 112 and a payload 290. A protocol header 112 includes one or more of a protocol class field 116, a protocol class version field 118, an operation code field 120, a request/response field 122, a request number field 124, and a payload length field 126. For example, the operation code field 120 includes an operation code value of 11 hex, the request/response field 122 includes a value of 0 (e.g., to signify a request), and the payload length field 126 includes a value representing a number of bytes of the payload 290. The method to generate and utilize the DSN authentication request frame 288 is described in greater detail with reference to FIG. 15B.

A payload 290 includes a SNAP token field 294 and may include a handshake identifier (ID) field 292. A handshake ID field 292 includes an authenticating code (e.g., a mechanism name), wherein the authenticating code references a valid authenticating process. A valid authenticating process includes one or more authentication mechanisms including at least one of a deterministic algorithm, a stored data manipulation method, a received data manipulation method, a compression scheme, a checksum scheme, a signature function, a hashing function, and an encryption method. A handshake ID field 292 may be encoded utilizing distinguished encoding rules (DER) as an unsigned integer. As such, the handshake ID field 292 is variable in length. A SNAP token field 294 includes at least one of authenticating data and an authorization status. Authenticating data includes at least one of the authentication mechanisms and a field type indicator. A field type indicator indicates whether a first parameter is a string or an integer. An authorization status indicates at least one of mechanism accepted, mechanism rejected, and mechanism continuation. For example, the SNAP token field 294 is generated to include a client nonce and a client certificate chain when a first DSN authentication request frame is generated and sent to a server.

In an example of operation, a first device determines to initiate an authorization sequence with a second device of a DSN. A determination may be based on one or more of a bootup sequence, a new DSN element activation indicator, a request, a communications error message, a schedule, an error indicator, a performance indicator, a reliability indicator, a predetermination, a message, and a command. For example, the first device determines to initiate the authorization sequence when the second device is newly activated and is required to authenticate with the first device. Next, the first device generates the SNAP token field 294. The generation may be based on one or more of a SNAP protocol table lookup, a mechanism of a previous authorization sequence, a status of a previous authorization sequence, a signature requirement, an authentication requirement, a message, a previous request, and a command. For example, the first device generates the SNAP token field 294 by retrieving the token from the SNAP protocol table. As another example, the first device generates the SNAP token field 294 to include a client nonce and a client certificate chain. The first device determines the handshake ID field 292 based on one or more of the SNAP token field 294, a SNAP protocol table lookup, a currently active handshake ID, a currently inactive handshake ID, a random number generator function output, a device ID, a unit ID, a message, and a command. For example, the processing module determines the handshake ID field 292 that corresponds to the authenticating code of SNAP token field 294 based on a SNAP protocol table lookup. As another example, the processing module determines the handshake ID field 292 to be null when the DSN authentication request frame 288 is a first frame of an authentication sequence. For instance, the DSN authentication request frame 288 includes a SNAP token field 294 that includes a mechanism name, a client token (e.g., a user identifier and a password), and a client nonce for the first frame of the authentication sequence (e.g., no specific handshake ID field 292).

In the example continued, the first device forms the DSN authentication request frame 288 by generating the protocol header and forming the payload based on the SNAP token field 294 and the handshake ID field 292. The first device sends the DSN authentication request frame 288 to the second device. The second device receives the DSN authentication request frame 288. The second device processes the SNAP token field 294 in accordance with the handshake ID field 292 to produce a SNAP token response to generate a DSN authentication response frame. For example, the second device generates its SNAP token field to include a server nonce, a server signature, and a server certificate chain. The second device transmits the DSN authentication response frame to the first device. The first device receives the DSN authentication response frame and compares the SNAP token response to an anticipated SNAP token response. For example, the first device verifies the server signature and generates a second SNAP token to include a signature. Next, the first device sends a second DSN authentication request frame that includes the second SNAP token to the second device. The second device verifies the signature and response with another DSN authentication response frame that includes an empty SNAP token. The first device receives the other DSN authentication response frame and determines that the second device is authenticated based on the empty SNAP token. The first device indicates that the second device is authenticated when the final response is favorable. The format of the DSN authentication response frame is discussed in greater detail with reference to FIG. 16A. The method to generate the DSN authentication response frame is discussed in greater detail with reference to FIG. 16B.

FIG. 15B is a flowchart illustrating an example of authenticating a device of a dispersed storage network (DSN). The method begins at step 296 where a processing module generates a DSN authentication request frame, in accordance with a storage network authentication protocol (SNAP) request message format, that includes authenticating data and may include an authenticating code, wherein the authenticating code references a valid authenticating process. The method continues at step 298 where the processing module transmits the DSN authentication request frame to the device. The method continues at step 300 where the processing module receives a DSN authentication response frame that includes processed authenticating data, wherein the device processed the authenticating data in accordance with the valid authentication process to produce the processed authenticating data. Alternatively, the method continues at step 308 when the processing module receives a DSN response message indicating that the device does not include a valid authentication process. For example, the DSN response message includes a list of supported mechanisms, a server certificate chain, and a signature of the mechanism list and of a client nonce.

The method continues at step 302 where the processing module compares the processed authenticating data with anticipated processed authenticating data. Anticipated processed authenticating data may be based on one or more of the authenticating code, the authenticating data, the valid authenticating process, and processing the authenticating data utilizing the valid authenticating process to produce the anticipated processed authenticating data. The method branches to step 306 when the processing module determines that the processed authenticating data does not compare favorably with the anticipated processed authenticating data. The method continues to step 304 when the processing module determines that the processed authenticating data compares favorably with the anticipated processed authenticating data.

The method continues at step 304 where the processing module indicates authentication of the device. The indication includes at least one of sending a message that includes an indication of authentication of the device and setting an authorization indicator to indicate authentication of the device. Alternatively, at step 304, the processing module determines whether a mechanism sequence has been completed. The processing module indicates authentication of the device when the mechanism sequence has been completed. The processing module continues authentication of the device when the mechanism sequence has not been completed. For example, the processing module generates an alternative DSN authentication request frame that includes an alternative SNAP token (e.g., including a digital signature) and transmits the alternative DSN authentication request frame to the device. Such a mechanism sequence may include any number of cycles of requests and responses. The method continues at step 306 where the processing module indicates failure of authentication of the device. Such indication includes at least one of sending a message that includes an indication of failure of authentication of the device and setting the authorization indicator to indicate failure of authentication of the device.

The method continues at step 308 where the processing module receives the DSN response message indicating that the device does not include a valid authentication process. The processing module may validate the list of supported mechanisms of the DSN response message by verifying the signature of the mechanism list and the client nonce. Note that such a step provides a security improvement for the system by preventing an attacker from forcing a client to authenticate with a weaker or flawed authentication mechanism by sending a fraudulent message that a server does not support the mechanism that a client initially attempted to use. The nonce verification provides a security improvement for the system by preventing replay attacks of such a message.

The method continues at step 310 where the processing module selects a second valid authentication process in response to the DSN response message. Such selecting includes performing a lookup; selecting the second valid authentication process from a validated list of supported authentication mechanisms, wherein the list of supported authentication mechanisms is included in the DSN response message (e.g., validated by validating a signature over the list of supported authentication mechanisms); transmitting a request message to a DSN manager requesting the second valid authentication process and receiving a response message that includes at least one of the second valid authentication process and the second authenticating code; and generating a second DSN authentication request frame that includes the authenticating data and a second authenticating code, wherein the second authenticating code references the second valid authenticating process. At step 310, the processing module transmits the second DSN authentication request frame to the device.

Figure 16B:
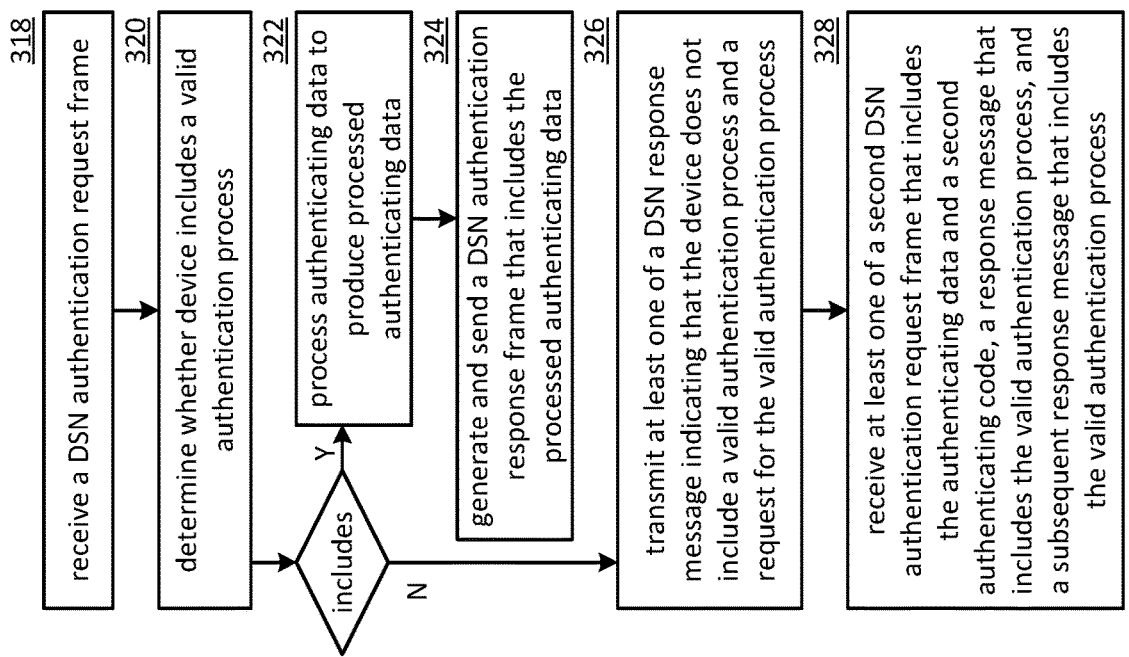
FIG. 16B is a flowchart illustrating another example of authenticating a device of a dispersed storage network (DSN) in accordance with the invention.
Figure 16A:
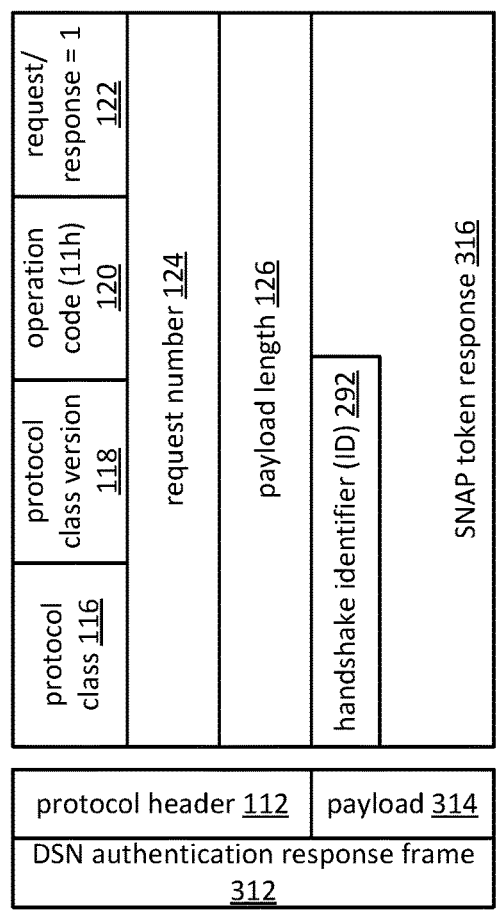
FIG. 16A is a diagram illustrating an example of a storage network authentication protocol (SNAP) response message format in accordance with the invention.

FIG. 16A is a diagram illustrating an example of a storage network authentication protocol (SNAP) response message format of a dispersed storage network (DSN) authentication response frame. A DSN authentication response frame 312 includes a protocol header 112 and a payload 314. A protocol header 112 includes one or more of a protocol class field 116, a protocol class version field 118, an operation code field 120, a request/response field 122, a request number field 124, and a payload length field 126. For example, the operation code field 120 includes an operation code value of 11 hex, the request/response field 122 includes a value of 1 (e.g., to signify a response), and the payload length field 126 includes a value representing a number of bytes of the payload 314. The method to generate and utilize the DSN authentication response frame 312 is described in greater detail with reference to FIG. 16B.

A payload 314 includes a handshake identifier (ID) field 292 and a SNAP token response field 316. A SNAP token response field 316 includes at least one of processed authenticating data and an authorization status. Processed authenticating data includes at least one of a field type indicator and one or more results of processing the authenticating data of a corresponding DSN authentication request frame in accordance with authentication mechanisms referenced by the DSN authentication request from.

In an example of operation a second device receives the DSN authentication request frame and processes authenticating data of the DSN authentication request frame in accordance with a valid authenticating process referenced by an authentication code of the DSN authentication request frame to produce the DSN authentication response frame. The second device transmits the DSN authentication response frame to a first device. Alternatively, the second device transmits a DSN response message indicating that the device does not include the valid authentication process and receives a second DSN authentication request frame that includes the authenticating data and a second authenticating code when the second device does not include the valid authentication process. Alternatively, the second device transmits a request for the valid authentication process and receives a subsequent response message that includes the valid authentication process when the second device does not include the valid authentication process.

FIG. 16B is a flowchart illustrating another example of authenticating a device of a dispersed storage network (DSN). The method begins with step 318 where a processing module receives a DSN authentication request frame that includes authenticating data and an authenticating code, wherein the authenticating code references a valid authenticating process. The method continues at step 320 where the processing module determines whether the device includes the valid authentication process referenced by the authentication code. A determination may be based on one or more of a memory scan, a table lookup, the query, and a message. The method branches to step 326 when the processing module determines that the device does not include the valid authentication process. The method continues to step 322 when the processing module determines that the device includes the valid authentication process.

The method continues at step 322 where the processing module processes the authenticating data in accordance with the valid authentication process to produce processed authenticating data. For example, the processing module performs a hashing function on the authenticating data to produce the processed authenticating data, wherein the hashing function is referenced by the authentication code. The method continues at step 324 where the processing module generates a DSN authentication response frame that includes the processed authenticating data in accordance with a storage network authentication protocol response message format. At step 324, the processing module transmits the DSN authentication response frame (e.g., to a requesting entity associated with the DSN authentication request frame).

The method continues at step 326 where the processing module transmits at least one of a DSN response message indicating that the device does not include the valid authentication process and a request for the valid authentication process (e.g., to a DSN manager) when the device does not include the valid authentication process. The method continues at step 328 where the processing module receives at least one of a second DSN authentication request frame that includes the authenticating data and a second authenticating code, a response message that includes the valid authentication process, and a subsequent response message that includes the valid authentication process, wherein the second authenticating code references a second valid authenticating process. The processing module may save the second valid authentication process and associated second authenticating code to facilitate subsequent utilization of the second valid authentication process one the second authenticating code is received in another DSN authentication request from.

Figure 17A:
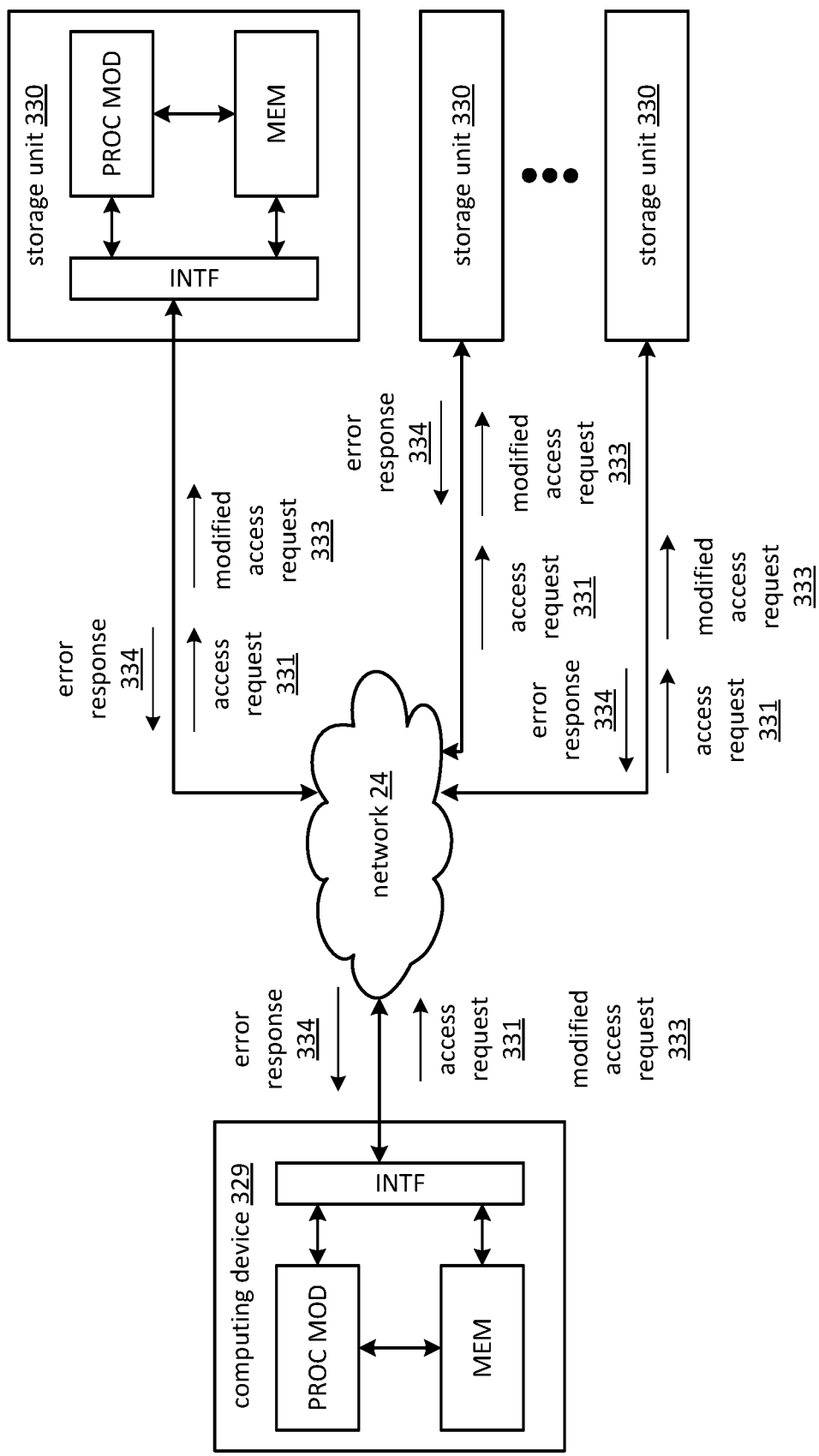
FIG. 17A is a schematic block diagram of another embodiment of a dispersed storage network in accordance with the invention.

FIG. 17A is a schematic block diagram of another embodiment of a dispersed storage network (DSN) that includes a computing device 329, a network 24 of FIG. 1, and a plurality of storage units 330. Each of the computing device 329 and the plurality of storage units 330 may be implemented utilizing at least one of a dispersed storage (DS) processing unit, a DS processing module, a DS managing unit, a DS managing module, a storage integrity processing unit, a DS rebuilding module, a DS unit, and a user device. For example, the computing device 329 is implemented as the DS processing unit and the plurality of storage units 330 are implemented as a plurality of DS units. Each of the computing device 329 and the plurality of storage units 330 includes a processing module (PROC MOD), a memory (MEM), and an interface (INTF). The memory includes one or more of a memory device, a memory array, a solid state memory device, a magnetic disk memory device, and an optical disc memory device. The interface may be implemented as at least one of a DSN interface 32 of FIG. 1 and an interface 30 of FIG. 1.

The DSN performs four primary functions including a first primary function to receive responses corresponding to access requests 331, a second primary function to ascertain an error cause for errors of the responses, a third primary function to determine an error remedy, and a fourth primary function to implement the error remedy. The access requests 331 includes one or more of a read request (e.g., a read slice request), a write request (e.g., a write slice request), a delete request (e.g., a delete slice request), a list request (e.g., a list slices request), a list digest request (e.g., a digest of a slice list request), a checked write request (e.g., a conditional write slice request based on a slice revision condition), and any other request utilized to access resources within the DSN. The errors of the responses includes one or more errors reported by a responding DSN entity with regards to one or more received access requests of the access requests 331.

The first primary function to receive the responses corresponding to the access requests 331 includes a series of receiving steps. In a first receiving step, the processing module of the computing device 329 sends, via the interface of the computing device 329, the access requests 331 to a threshold number of the storage units 330 of the DSN. The threshold number of the storage units 330 includes one of a variety of approaches of a level of the threshold number. A first approach includes a write threshold number of storage units 330 when the access requests 331 are the write access requests. A second approach includes a read threshold number of storage units 330 when the access requests 331 are the read access requests. A third approach includes a decode threshold number of storage units 330 when the access requests 331 are the read access requests. In a second receiving step, the processing module of the computing device 329 receives, from each of at least some of the threshold number of storage units via the network 24 and the interface of the computing device 329, an access response or an error response 334.

The access response indicates a favorable outcome with regards to a corresponding access request 331. For example, the access response includes a write slice response confirming writing of an associated encoded data slice when the corresponding access request 331 includes the write slice request. As another example, the access response includes a read slice response including a requested encoded data slice when the corresponding access request 331 includes the read slice request. The error response 334 indicates an unfavorable outcome with regards to the corresponding access request. For example, the error response 334 indicates a failure of writing the associated encoded data slice when the corresponding access request 331 includes the write slice request. As another example, the error response 334 indicates a failure of reading the requested encoded data slice when the corresponding access request 331 includes the read slice requests.

The second primary function to ascertain the error cause for the errors of the responses includes a variety of ascertaining approaches. When one error response 334 is received from a storage unit 330 of the at least some of the threshold number of storage units 330 in response to one of the access requests 331, a first ascertaining approach includes the processing module of the computing device 329 ascertaining a likely cause for an error corresponding to the error response 334.

The processing module of the computing device 329 ascertains the likely cause for the error by interpreting the error response 334 to identify an error class, where the error class includes one or more conditions. A first condition includes an unknown operation error condition (e.g., an operation or an operation class is not understood by the storage unit 330). A second condition includes an invalid name error condition (e.g., not a valid slice name for the storage unit 330). A third condition includes an operation conflict error condition (e.g., cannot fulfill request because of a requested operation by another computing device such as when a requested encoded data slice is locked by the other computing device). A fourth condition includes a check error condition (e.g., revision level mismatch). A fifth condition includes an internal storage unit error condition (e.g., a hardware or software failure of the storage unit 330). A sixth condition includes an unauthorized request error condition (e.g., the computing device 329 is not authorized to perform an operation associated with the access request 331). A seventh condition includes an invalid address range error condition (e.g., an address range of the access requests 331 not in assigned DSN address range of the storage unit 330).

The processing module of the computing device 329 may further interpret the error response 334 to identify corresponding error detail, where the corresponding error detail includes one or more details. When the error class is the unknown operation error condition, a first detail includes identity of the unknown operation (e.g., an operation code). When the error class is the invalid name error condition, a second detail includes a slice name of an encoded data slice, where the slice name is invalid with respect to the storage unit 330. When the error class is the operation conflict error condition, a third detail includes identity of a conflicting operation and identity of an issuer of the conflicting operation. When the error class is the check error condition, a fourth detail includes an indication that a revision level of the one of the access requests 331 does not correspond to an expected revision level by the storage unit 330. When the error class is the unauthorized request error condition, a fifth detail includes an indication that one or more requesting devices (e.g., including at least one of the computing device 329 and another computing device) is not authorized. When the error class is the invalid address range error condition, a sixth detail includes an indication that a requested DSN address is outside of a range of DSN addresses allocated to the storage unit 330.

When more than one error response 334 is received from more than one storage units 330 of the at least some of the threshold number of storage units 330 in response to more than one of the access requests 331, a second ascertaining approach of the variety of ascertaining approaches includes the processing module of the computing device 329 performing a series of cause determining steps. In a first cause determining step, for each of the more than one error responses 334, the processing module of the computing device 329 ascertains a likely cause for the error corresponding to the error response 334 to produce a set of likely causes. In a second cause determining step, the processing module of the computing device 329 interprets the set of likely causes to determine whether the set of likely causes includes a common cause (e.g., similar, same) or different causes.

The third primary function to determine the error remedy includes a variety of remedy approaches. In a first remedy approach of the variety of remedy approaches, when the one error response 334 is received from the storage unit 330 of the at least some of the threshold number of storage units 330 in response to the one of the access requests 331, the processing module of the computing device 329 determines, based on the likely cause for the error, whether to perform at least one of resending the one of the access requests 331 to the storage unit 330 (e.g., after waiting to allow updating of at least one of configuration information and software), issuing a modified access request 333 to the storage unit 330 (e.g., select a different DSN address), and sending the one of the access requests 331 to another storage unit 330 (e.g., where the other storage unit 330 is available and compatible with the one of the access requests 331).

In a second remedy approach of the variety of remedy approaches, when the more than one error response 334 is received from the more than one storage units 330 of the at least some of the threshold number of storage units 330 in response to the more than one of the access requests 331 and when the set of likely causes includes the common cause, the processing module of the computing device 329 determines, based on the common cause, whether to perform at least one of a series of remedy alternatives. In a first remedy alternative, the processing module of the computing device 329 resends the more than one of the access requests 331 to the more than one storage units 330 (e.g., after waiting for an update or another process to conclude). In a second remedy alternative, the processing module of the computing device 329 issues more than one modified access requests 333 to the more than one storage units 330 (e.g., using a different set of slice names, using a different operation code). In a third remedy alternative, the processing module of the computing device 329 sends the more than one of the access requests 331 to more than one other storage units 330 (e.g., to a set of storage units 330 compatible with the more than one of the access requests 331).

The fourth primary function to implement the error remedy includes a first and a second major remedy implementing approaches. In the first major remedy implementing approach, when the one error response 334 is received from the storage unit 330 of the at least some of the threshold number of storage units 330 in response to the one of the access requests, the processing module of the computing device 329 performs at least one of a variety of remedy sub-approaches. In a first remedy sub-approach of the first major remedy implementing approach, the processing module of the computing device 329 performs an alternate second primary function to determine the likely cause to be a timing delay between one or more computing devices including the computing device 329 and another computing device (e.g., one or more requesting devices) and the storage unit 330 updating DSN memory addressing allocation information. The first remedy sub-approach further includes the processing module of the computing device 329 waiting for the timing delay to pass and resending, via the interface of the computing device 329, the one of the access requests 331 to the storage unit 330.

In a second remedy sub-approach of the first major remedy implementing approach, the processing module of the computing device 329 performs another alternate second primary function to determine the likely cause to be an assigned DSN address of the one of the access requests 331 to be outside the allocated range of DSN addresses for the storage unit 330. The second remedy sub-approach further includes the processing module of the computing device 329 modifying the one of the access requests 331 to include a DSN address within the allocated range of DSN addresses to produce a modified access request 333 and sending, via the interface of the computing device 329 the modified access request 333 to the storage unit 330.

In a third remedy sub-approach of the first major remedy implementing approach, the processing module of the computing device 329 performs yet another alternate second primary function to determine the likely cause to be a conflict between DSN memory allocation information of the one or more computing devices (e.g., the one or more requesting devices) and the DSN memory allocation information of the storage unit 330. For example, the storage unit 330 was off line when the DSN memory allocation information of the storage unit 330 was sent to the storage unit 330. The third remedy sub-approach further includes the processing module of the computing device 329 selecting the other storage unit 330 and sending, via the interface of the computing device 329 the one of the access requests 331 to the other storage unit 330.

In the second major remedy implementing approach of the fourth primary function of the DSN, when the more than one error response 334 is received from the more than one storage units 330 of the at least some of the threshold number of storage units 330 in response to the more than one of the access requests 331, the processing module of the computing device 329 performs at least one of a variety of multiple unit approaches. In a first multiple unit approach of the variety of multiple unit approaches of the second major remedy implementing approach, when the set of likely causes includes the different causes, the processing module of the computing device 329 issues a system maintenance error (e.g., sends an error message to a DSN managing unit).

In a second multiple unit approach of the variety of multiple unit approaches of the second major remedy implementing approach, when the set of likely causes includes the different causes, the processing module of the computing device 329 determines whether the different causes are time dependent errors, where, by waiting for synchronization of information to occur across the DSN resolves the time dependent errors. When the different causes are time dependent errors, the processing module of the computing device 329 waits a predetermined period of time and then resends, via the interface of the computing device 329, the more than one of the access requests 331 to the more than one storage units 330.

In a third multiple unit approach of the variety of multiple unit approaches of the second major remedy implementing approach, when the set of likely causes includes the different causes, the processing module of the computing device 329 individually resolves the different causes. When the different causes are resolved, the processing module of the computing device 329 resends, via the interface of the computing device 329, the more than one of the access requests 331 to the more than one storage units 330.

Figure 17B:
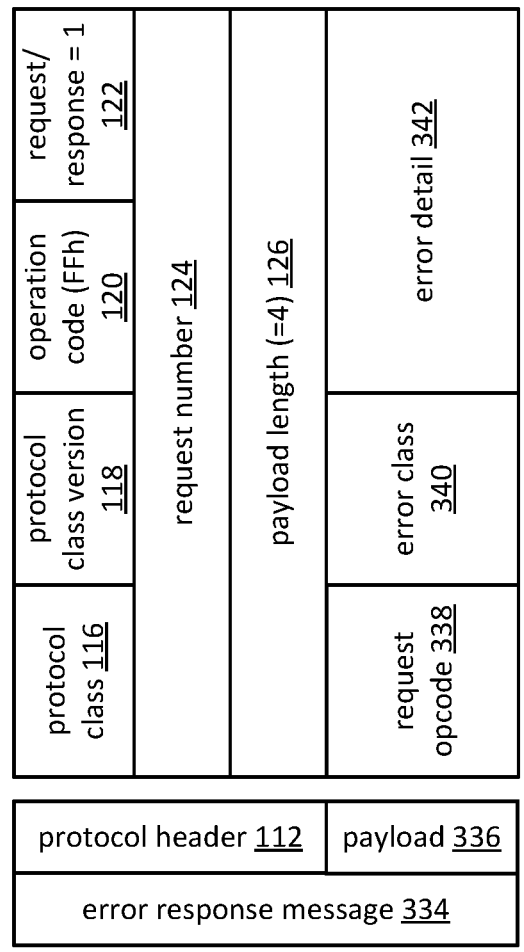
FIG. 17B is a diagram illustrating an example of an error response message format in accordance with the invention.

FIG. 17B is a diagram illustrating an example of an error response message format of an error response message 334. The error response message 334 includes a protocol header 112 and a payload 336. The protocol header 112 includes one or more of a protocol class field 116, a protocol class version field 118, an operation code field 120, a request/response field 122, a request number field 124, and a payload length field 126. For example, the operation code field 120 includes an operation code value of FF hex to denote an error response, the request/response field 122 includes a value of 1 (e.g., to denote a response as opposed to a request), and the payload length field 126 includes a value representing a number of bytes of the payload 336.

The payload 336 includes one or more of a request opcode field 338, an error class field 340, and an error detail field 342. The request opcode field 338 indicates an opcode of a previously received request message associated with an error condition. The error class field 340 includes an error class indicating a first level descriptor of the error condition. An error detail field 342 includes an error detail indicating a second level descriptor associated with the error class and the error condition. For example, the opcode field 338 indicates opcode 10 hex when an opcode associated with a previously received request message associated with the error condition was a start transport layer security (TLS) request message. As another example, the error class field 340 indicates 30 hex when the request message is not allowed. As yet another example, the error detail field 342 indicates 3294 hex when a requesting element of a dispersed storage network (DSN) is unauthorized to initiate a start TLS sequence. In an instance of implementation, the request opcode field 338 is one byte in length, the error class field 340 is one byte in length, and the error detail field 342 is two bytes in length. Alternatively, the payload 336 includes a single error class field 340 that includes four bytes.

In an example of operation, a storage network authentication protocol (SNAP) request message is received from a requesting entity. The received SNAP request message is processed to identify an error condition associated with the authentication request when the request is unauthorized. The error response message 334 is generated to include a request opcode that includes an opcode of the SNAP request message. The error class and error detail are generated in accordance with the error condition of the authentication request (e.g., indicating that the request is unauthorized). The error response message 334 is sent to the requesting entity.

Figure 17C:
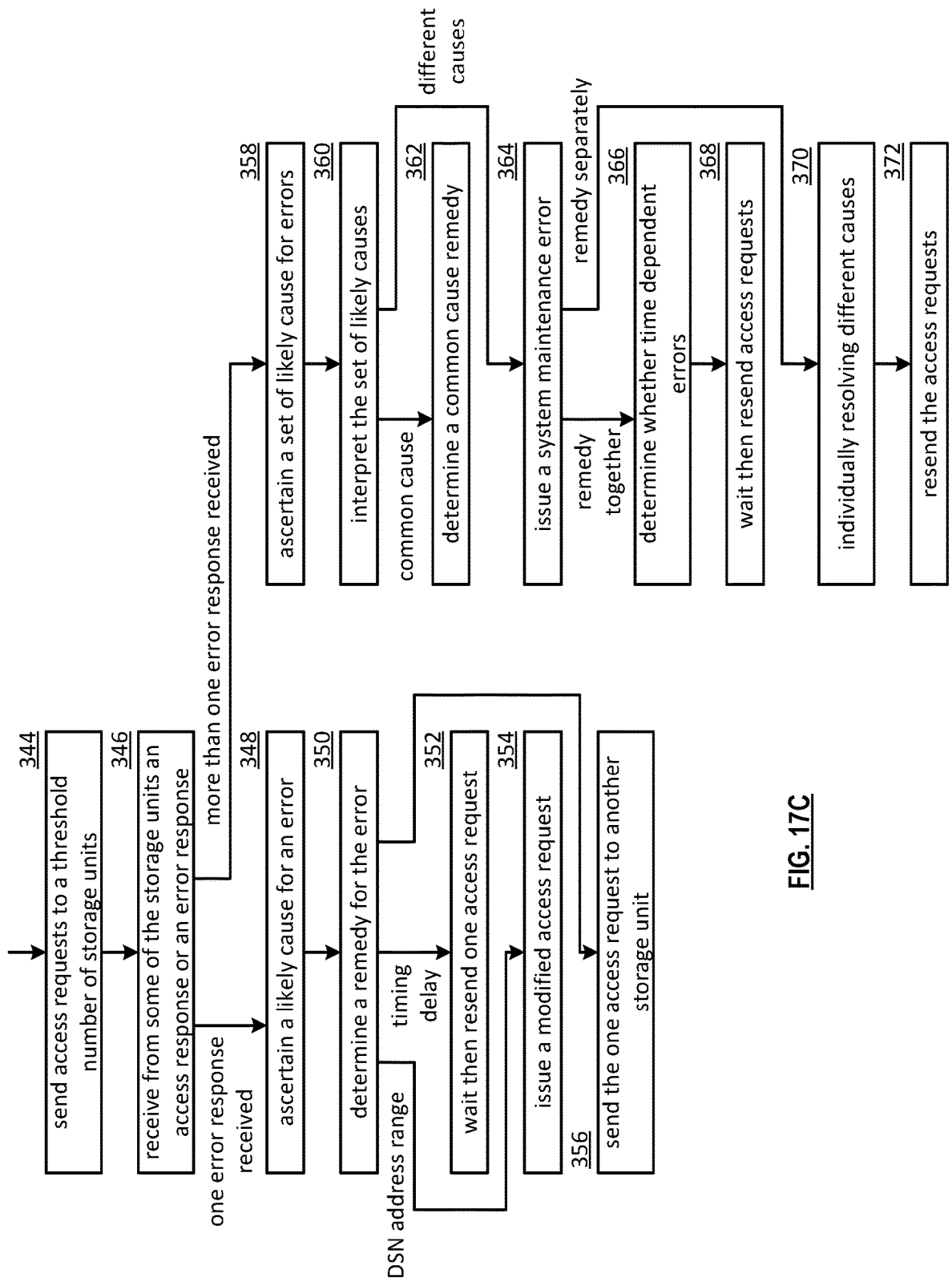
FIG. 17C is a flowchart illustrating an example of generating an error response message in accordance with the invention.

FIG. 17C is a flowchart illustrating an example of generating an error response message. The method begins at step 344 where a processing module (e.g., of a computing device of one or more computing devices of a dispersed storage network (DSN), of a requesting device of one or more requesting devices of the DSN) sends access requests to a threshold number of storage units of the DSN. The threshold number of storage units includes one of a write threshold number of storage units when the access requests are write access requests, a read threshold number of storage units when the access requests are read access requests, and a decode threshold number of storage units when the access requests are the read access requests. The method continues at step 346 where the processing module receives, from each of at least some of the threshold number of storage units, an access response or an error response. When one error response is received from a storage unit of the at least some of the threshold number of storage units in response to one of the access requests, the method continues at step 348 where the processing module ascertains a likely cause for an error corresponding to the error response.

The ascertaining the likely cause for the error includes interpreting the error response to identify an error class, wherein the error class includes one or more of a variety of conditions. A first condition includes an unknown operation error condition. A second condition includes an invalid name error condition. A third condition includes an operation conflict error condition. A fourth condition includes a check error condition. A fifth condition includes an internal storage unit error condition. A sixth condition includes an unauthorized request error condition. A seventh condition includes an invalid address range error condition.

The processing module may interpret the error response to identify corresponding error detail, where the corresponding error detail includes one or more details. When the error class is the unknown operation error condition, a first detail includes identity of the unknown operation. When the error class is the invalid name error condition, a second detail includes a slice name of an encoded data slice, wherein the slice name is invalid with respect to the storage unit. When the error class is the operation conflict error condition, a third detail includes identity of a conflicting operation and identity of an issuer of the conflicting operation. When the error class is the check error condition, a fourth detail includes an indication that a revision level of the one of the access requests does not correspond to an expected revision level by the storage unit. When the error class is the unauthorized request error condition, a fifth detail includes an indication that the one or more requesting devices is not authorized. When the error class is the invalid address range error condition, a sixth detail includes an indication that a requested DSN address is outside of a range of DSN addresses allocated to the storage unit.

The ascertaining the likely cause may further include at least one of a variety of determining approaches. A first determining approach includes the processing module determining the likely cause to be a timing delay between one or more requesting devices and a storage unit updating DSN memory addressing allocation information. A second determining approach includes the processing module determining the likely cause to be an assigned DSN address of the one of the access requests to be outside an allocated range of DSN addresses for the storage unit. A third determining approach includes the processing module determining that the likely cause to be a conflict between DSN memory allocation information of the one or more requesting devices and the DSN memory allocation information of the storage unit.

The method continues at step 350 where the processing module determines, based on the likely cause for the error, whether to implement at least one of a variety of remedy approaches. In a first remedy approach, the processing module resends the one of the access requests to the storage unit. In a second remedy approach, the processing module issues a modified access request to the storage unit. In a third remedy approach, the processing module sends the one of the access requests to another storage unit. When the likely cause was determined to be the timing delay, the method continues at step 352 where the processing module waits for the timing delay to pass and resends the one of the access requests to the storage unit. When the likely cause was determined to be the assigned DSN address of the one of the access requests to be outside of the allocated range of the DSN addresses for the storage unit, the method continues at step 354 where the processing module modifies the one of the access requests to include a DSN address within the allocated range of DSN addresses to produce the modified access request and sends the modified access request to the storage unit. When the likely cause was determined to be the conflict, the method continues at step 356 where the processing module selects the other storage unit and sends the one of the access requests to the other storage unit.

When more than one error response is received from more than one storage units of the at least some of the threshold number of storage units in response to more than one of the access requests, for each of the more than one error responses, the method continues at step 358 where the processing module ascertains a likely cause for the error corresponding to the error response to produce a set of likely causes. The method continues at step 360 where the processing module interprets the set of likely causes to determine whether the set of likely causes includes a common cause or different causes. When the set of likely causes includes the common cause, the method continues at step 362 where the processing module determines, based on the common cause, whether to implement one or more of a variety of common cause remedies. In a first common cause remedy, the processing module resends the more than one of the access requests to the more than one storage units. In a second common cause remedy, the processing module issues more than one modified access requests to the more than one storage units. In a third common cause remedy, the processing module sends the more than one of the access requests to more than one other storage units. Next, the processing module may implement one or more selected common cause remedies.

When the set of likely causes includes the different causes, the method continues at step 364 where the processing module issues a system maintenance error. The processing module may remedy the errors of the different causes together or separately. When the processing module remedies the errors of the different causes together, and when the set of likely causes includes the different causes, the method continues at step 366 where the processing module determines whether the different causes are time dependent errors, where, by waiting for synchronization of information to occur across the DSN resolves the time dependent errors. When the different causes are time dependent errors, the method continues at step 368 where the processing module waits a predetermined period of time and then resends the more than one of the access requests to the more than one storage units. When the processing module remedies the errors of the different causes separately, and when the set of likely causes includes the different causes, the method continues at step 370 where the processing module individually resolves the different causes. When the different causes are resolved, the method continues at step 372 where the processing module resends the more than one of the access requests to the more than one storage units.

As may be used herein, the terms "substantially" and "approximately" provides an industry-accepted tolerance for its corresponding term and/or relativity between items. An industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any Alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by one or more processing modules of one or more computing devices of a dispersed or distributed storage network (DSN), the method comprises:
    detecting a performance issue associated with operation of the DSN;
    determining whether one or more pending data access requests are affected by the performance issue associated with operation of the DSN;
    in response to a determination that the performance issue affects the one or more pending data access requests, identifying a storage unit (SU) that is suspected of contributing to the performance issue, wherein the identifying is based on an error type for the performance issue;
    based on both the performance issue and an SU type of the SU, determining a performance test for the SU, wherein the DSN includes a plurality of SU types;
    transmitting, via an interface of a computing device of the one or more computing devices, one or more test request messages to the SU, wherein the one or more test request messages includes test information based on an SU type of the SU and to be used by the SU to execute the performance test;
    in response to the one or more test request messages transmitted to the SU, receiving a test response message that includes data generated by the SU based on the test information; and
    resolving the performance issue based on the test response message.

2. The method of claim 1 further comprises:
    detecting another performance issue associated with operation of the DSN;
    determining whether the one or more pending data access requests are further affected by the another performance issue associated with operation of the DSN;
    in response to a determination that the another performance issue affects the one or more pending data access requests,
    identifying another SU that is suspected of contributing to the performance issue, wherein the identifying is based on an error type for the another performance issue;
    based on both the performance issue and an SU type of the another SU, determining another performance test for the another SU;
    transmitting, via the interface of a computing device of the one or more computing devices, another test request message to the another SU, wherein the another test request message includes test information based on an SU type of the another SU and to be used by the another SU to execute the another performance test;
    in response to the another test request message transmitted to the another SU, receiving another test response message that includes data generated by the another SU based on the test information of the another SU; and
    resolving the another performance issue based on the another test response message.

3. The method of claim 2 further comprises:
    when the performance issue and the another performance issue are not individually contributing to the performance issue of the DSN, determining whether a combination of the performance issue and the another performance issue is collectively contributing to the performance issue of the DSN.

4. The method of claim 1, wherein the detecting a performance issue associated with operation of the DSN is based on at least one of:
    detecting a communication error to, from, or between one or more SUs of a set of SUs associated with the DSN;
    detecting a storage error indication regarding one or more SUs of the set of SUs;
    detecting a reading error indication regarding the one or more SUs of the set of SUs;
    in response to performing a general test in accordance with a DSN test schedule;
    detecting a reliability issue regarding the one or more SUs of the set of SUs; and
    receiving a potential failing performance indicator regarding the one or more SUs of the set of SUs.

5. The method of claim 1, wherein identifying the SU that is suspected of contributing to the performance is further based on at least one of:
    when the performance issue is based on a communication error, identifying the SU based on a failure of the SU to send a communication or to acknowledge receipt of the communication;
    when the performance issue is based on a storage error, identifying the SU based on a failure to provide confirmation of successfully completing a storage request;
    when the performance issue is based on a read error, identifying the SU based on a failure to provide retrieved data in accordance with a read request;
    receiving a message identifying the SU as having a potential reliability issue; and
    receiving a message identifying the SU as having the performance issue.

6. The method of claim 1, wherein the one or more processing modules includes at least one of:
    a DS processing unit;
    a DS processing module;
    a DS managing module;
    a DS rebuilding module; and
    a user device.

7. The method of claim 1, further comprising:
    generating the one or more test request messages, wherein the generating each of the one or more test request messages includes generating a protocol header and wherein the protocol header includes at least one of an operation code field to identify the message as a test message, a request/response field to identify the message as a request message, a request number field to identify the message as a particular test request message and a payload length field.

8. The method of claim 7, wherein the generating the one or more test messages further comprises at least one of:

generating a payload to test data transfer speed, wherein the payload includes:
  a response length field to indicate a desired length of the response message or portion thereof; and
  the test information specific for the SU that includes an indication of the data transfer speed test and minimal data for transferring between the SU and the one or more requesting devices to test speed;
generating a payload to test data transfer bandwidth, wherein the payload includes:
  the response length field to indicate the desired length of the response message or the portion thereof; and
  the test information specific for the SU that includes an indication of the data transfer bandwidth test and a large amount of data for transferring between the SU and the one or more requesting devices to test bandwidth;
generating a payload to test data transfer latency, wherein the payload includes:
  the response length field to indicate the desired length of the response message or the portion thereof; and
  the test information specific for the SU that includes an indication of the data transfer latency test and data for transferring between the SU and the one or more requesting devices to test latency; and
generating a payload to test error rate of data transfer, wherein the payload includes:
  the response length field to indicate the desired length of the response message or the portion thereof; and
  the test information specific for the SU that includes an indication of the data transfer error rate test and control data for transferring between the SU and the one or more requesting devices to test error rate.

9. A computer readable memory comprises:
a first memory element that stores operational instructions that, when executed by a computer of a dispersed storage network (DSN), causes the computer to:
  detect a performance issue associated with operation of the DSN;
  determine whether one or more pending data access requests are affected by the performance issue associated with operation of the DSN;
  in response to a determination that the performance issue affects the one or more pending data access requests, based on an error type for the performance issue, identify a storage unit (SU) that is suspected of contributing to the performance issue;
  based on both the performance issue and an SU type of the SU, determine a performance test for the SU, wherein the DSN includes a plurality of SU types;
  transmit one or more test request messages to the SU, wherein the one or more test request messages includes test information based on an SU type of the SU and to be used by the SU to execute the performance test;
  in response to the one or more test request messages, receive a test response message that includes data generated by the SU based on the test information; and
  resolve the performance issue, based on the test response message.

10. The computer readable memory of claim 9, wherein the first memory element further causes the computer to:
  detect another performance issue associated with operation of the DSN;
  determine whether the one or more pending data access requests are further affected by the another performance issue associated with operation of the DSN;
  in response to a determination that the another performance issue affects the one or more pending data access requests, identify another SU that is suspected of contributing to the performance issue;
  based on both the performance issue and an SU type of the another SU, determine another performance test for the another SU;
  transmit another test request message to the another SU, wherein the another test request message includes another test information based on an SU type of the another SU and to be used by the another SU to execute the another performance test;
  in response to the another test request message, receive another test response message that includes data generated by the another SU based on the another test information; and
  resolve the another performance issue, based on the another test response message.

11. The computer readable memory of claim 10, wherein the first memory element further causes the computer to:
  when the performance issue and the another performance issue are not individually contributing to the performance issue of the DSN, determine whether a combination of the performance issue and the another performance issue are collectively contributing to the performance issue of the DSN.

12. The computer readable memory of claim 9, wherein the first memory element further causes the computer to:
  detect the performance issue based on at least one of:
    detecting a communication error to, from, or between one or more SUs of a set of SUs;
    detecting a storage error indication regarding the one or more SUs of the set of SUs;
    detecting a reading error indication regarding the one or more SUs of the set of SUs;
    in response to performing a general test in accordance with a DSN test schedule;
    detecting a reliability issue regarding one or more responding devices; and
    receiving, via the interface, a potential failing performance indicator regarding the one or more SUs of the set of SUs.

13. The computer readable memory of claim 9, wherein the first memory element further causes the computer to identify the SU based on at least one of:
  when the performance issue is based on a communication error, identifying the SU based on a failure to send a communication or to acknowledge receipt of the communication;
  when the performance issue is based on a storage error, identifying the SU based on a failure to provide confirmation of successfully completing a storage request;
  when the performance issue is based on a read error, identifying the SU based on a failure to provide retrieved data in accordance with a read request;
  receiving, via the interface, a message identifying the SU as having a potential reliability issue; and
  receiving, via the interface, a message identifying the SU as having the performance issue.

14. The computer readable memory of claim 9, wherein the computer comprises at least one of:
  a DS processing unit;
  a DS processing module;
  a DS managing module;
  a DS rebuilding module; and
  a user device.

15. The computer readable memory of claim 9, wherein the first memory element further causes the computer to generate the one or more test request messages, wherein each of the one or more test request messages includes a protocol header and wherein the protocol header includes at least one of an operation code field to identify the message as a test message, a request/response field to identify the message as a request message, a request number field to identify the message as a particular test request message and a payload length field.

16. The computer readable memory of claim 15, wherein one or more test request messages is generated by at least one of:
  generating the payload to test data transfer speed, wherein the payload includes:
  a response length field to indicate a desired length of the response message or portion thereof; and
  the test information specific for the SU that includes an indication of the data transfer speed test and minimal data for transferring between the SU and one or more requesting devices to test speed;
  generating the payload to test data transfer bandwidth, wherein the payload includes:
  the response length field to indicate the desired length of the response message or the portion thereof; and
  the test information specific for the SU that includes an indication of the data transfer bandwidth test and a large amount of data for transferring between the SU and the one or more requesting devices to test bandwidth;
  generating the payload to test data transfer latency, wherein the payload includes:
  the response length field to indicate the desired length of the response message or the portion thereof; and
  the test information specific for the SU that includes an indication of the data transfer latency test and data for transferring between the SU and the one or more requesting devices to test latency; and
  generating the payload to test error rate of data transfer, wherein the payload includes:
  the response length field to indicate the desired length of the response message or the portion thereof; and
  the test information specific for the SU that includes an indication of the data transfer error rate test and control data for transferring between the SU and the one or more requesting devices to test error rate.

17. A non-transitory computer readable memory comprises:
  a first memory element that stores operational instructions that, when executed by a storage unit of a dispersed storage network (DSN), causes the storage unit to:
  receive a message from the DSN, wherein the message includes a protocol header and a payload, wherein the protocol header includes an indication to identify the message as a test request message and the payload includes test information specific for the SU to execute a performance test, wherein the test request message is based on a performance issue detected by the DSN and the performance test is based on the performance issue, wherein the performance test is specific to a type of SU for the SU, wherein the DSN includes a plurality of SU types;
  execute the performance test; and
  generate a test response message, wherein the test response message includes a response header and a response payload, wherein the response header includes an indication to identify the response message as a test response message and the response payload includes a specific test result data generated based on the test information.

18. The non-transitory computer readable memory of claim 17, wherein
  the protocol header includes:
  an operation code field to identify the message as a test message;
  a request/response field to identify the message as a request message;
  a request number field to identify the message as a particular test request message; and
  a payload length field.

19. The non-transitory computer readable memory of claim 17, wherein the payload further includes at least one of:
  a response length field that indicates a desired length of the test response message or a portion thereof and information specific for the SU that includes an indication of a data transfer speed and a minimum data transfer rate for transferring data between the SU and the DSN;
  a response length field that indicates a desired length of the test response message or a portion thereof and information specific for the SU that includes an indication of a data transfer bandwidth and a predetermined amount of data for transferring between the SU and one or more requesting devices;
  a response length field that indicates a desired length of the test response message or a portion thereof and test information specific for the SU that includes an indication of a data transfer latency and data for transferring between the SU and the one or more requesting devices; and
  a response length field that indicates a desired length of the test response message or a portion thereof and test information specific for the SU that includes an indication of a data transfer error rate and control data for transferring between the SU and the one or more requesting devices.

\* \* \* \* \*